United States Patent
Ono et al.

(10) Patent No.: US 9,006,326 B2
(45) Date of Patent: Apr. 14, 2015

(54) RUBBER COMPOSITION AND PNEUMATIC TIRE

(75) Inventors: Shuichiro Ono, Kobe (JP); Ryuichi Tokimune, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 14/347,290

(22) PCT Filed: Jun. 26, 2012

(86) PCT No.: PCT/JP2012/066206
§ 371 (c)(1),
(2), (4) Date: Mar. 26, 2014

(87) PCT Pub. No.: WO2013/077016
PCT Pub. Date: May 30, 2013

(65) Prior Publication Data
US 2014/0228501 A1      Aug. 14, 2014

(30) Foreign Application Priority Data

Nov. 24, 2011 (JP) .................................. 2011-256605
Nov. 24, 2011 (JP) .................................. 2011-256606
Nov. 24, 2011 (JP) .................................. 2011-256607

(51) Int. Cl.
C08K 5/548  (2006.01)
C08C 19/44  (2006.01)
C08K 3/36   (2006.01)
B60C 1/00   (2006.01)
C08F 230/08 (2006.01)

(52) U.S. Cl.
CPC ............... *C08K 3/36* (2013.01); *B60C 1/0016* (2013.04); *C08F 230/08* (2013.01); *C08K 5/548* (2013.01); *C08C 19/44* (2013.01)

(58) Field of Classification Search
CPC ........ C08K 3/36; C08K 5/548; B60C 1/0016; C08F 230/08; C08C 19/44
USPC .................... 524/493, 588; 526/173
See application file for complete search history.

(56) References Cited

U.S. PATENT DOCUMENTS

| | | |
|---|---|---|
| 5,574,109 A | 11/1996 | Lawson et al. |
| 2006/0173118 A1 | 8/2006 | Hochi et al. |
| 2010/0056703 A1 | 3/2010 | Oshima |
| 2012/0190771 A1 | 7/2012 | Ito et al. |
| 2012/0283354 A1 | 11/2012 | Hattori et al. |
| 2013/0085225 A1 | 4/2013 | Nishioka et al. |

FOREIGN PATENT DOCUMENTS

| | | | |
|---|---|---|---|
| JP | 48-17674 B1 | | 5/1973 |
| JP | 8-253520 A | | 10/1996 |
| JP | 2000023944 A | * | 1/2000 |
| JP | 2000-239444 A | | 9/2000 |
| JP | 2000-344955 A | | 12/2000 |
| JP | 2000344955 A | * | 12/2000 |
| JP | 2006-233177 A | | 9/2006 |
| JP | 2010-77413 A | | 4/2010 |
| JP | 2011-79913 A | | 4/2011 |
| JP | 2011079913 A | * | 4/2011 |
| JP | 2011-144324 A | | 7/2011 |
| JP | 2011144324 A | * | 7/2011 |
| JP | 2012-167257 A | | 9/2012 |
| WO | WO 2011/087004 A | | 7/2011 |
| WO | WO 2012/011571 A1 | | 1/2012 |

OTHER PUBLICATIONS

An English machine-translation of Japanese Patent No. 2000-239444-A, dated Sep. 5, 2000.
An English machine-translation of Japanese Patent No. 2011-144324-A, dated Jul. 28, 2011.
An English machine-translation of Japanese Patent No. 2011-79913-A, dated Apr. 21, 2011.

* cited by examiner

*Primary Examiner* — Kelechi Egwim
(74) *Attorney, Agent, or Firm* — Birch, Stewart, Kolasch & Birch, LLP

(57) ABSTRACT

Provided are a rubber composition capable of achieving a balanced improvement in fuel economy, tensile strength at break, and processability, and a pneumatic tire including the rubber composition. The invention relates to a rubber composition including a conjugated diene polymer and silica, the conjugated diene polymer being obtained by polymerizing a monomer component including a conjugated diene compound and a silicon-containing vinyl compound in the presence of a polymerization initiator represented by the following formula (I):

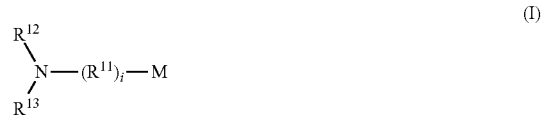

to produce a copolymer, and reacting a compound containing a nitrogen atom and/or a silicon atom with an active terminal of the copolymer, wherein the rubber composition includes the conjugated diene polymer in an amount of not less than 10% by mass per 100% by mass of a rubber component of the rubber composition, and the silica in an amount of 10-70 parts by mass per 100 parts by mass of the rubber component.

20 Claims, No Drawings

RUBBER COMPOSITION AND PNEUMATIC TIRE

TECHNICAL FIELD

The present invention relates to a rubber composition and a pneumatic tire formed from the rubber composition.

BACKGROUND ART

With the recent increase in concern about environmental issues, the demand on automobiles for better fuel economy is increasing. Better fuel economy is also being required of rubber compositions used for automotive tires. For example, rubber compositions containing a conjugated diene polymer (e.g. polybutadiene, butadiene-styrene copolymer) and a filler (e.g. carbon black, silica) are used for automotive tires.

Patent Literature 1 proposes a method for improving fuel economy; this method uses a diene rubber (modified rubber) that is modified by an organosilicon compound containing an amino group and an alkoxy group. The use of such a modified rubber improves fuel economy; however, it tends to increase Mooney viscosity so that processability can be deteriorated. Moreover, rubber compositions for automotive tires also need to have tensile strength at break, for example. As tensile strength at break is usually incompatible with fuel economy, balanced improvements in these properties are difficult to achieve at high levels.

CITATION LIST

Patent Literature

Patent Literature 1: JP 2000-344955 A

SUMMARY OF INVENTION

Technical Problem

An object of the present invention is to solve the problems identified above by providing a rubber composition capable of achieving a balanced improvement in fuel economy, tensile strength at break, and processability, and by providing a pneumatic tire including the rubber composition.

Solution to Problem

The present invention relates to a rubber composition, including
a conjugated diene polymer and
silica,
the conjugated diene polymer being obtained by polymerizing a monomer component including a conjugated diene compound and a silicon-containing vinyl compound in the presence of a polymerization initiator represented by the following formula (I):

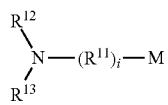

wherein i represents 0 or 1; $R^{11}$ represents a $C_{1-100}$ hydrocarbylene group; $R^{12}$ and $R^{13}$ each represent an optionally substituted hydrocarbyl group or a trihydrocarbylsilyl group, or $R^{12}$ and $R^{13}$ are bonded to each other to form a hydrocarbylene group optionally containing at least one, as a hetero atom, selected from the group consisting of a silicon atom, a nitrogen atom, and an oxygen atom; and M represents an alkali metal atom, to produce a copolymer, and
then reacting a compound containing at least one of a nitrogen atom and a silicon atom with an active terminal of the copolymer,
wherein the rubber composition includes
the conjugated diene polymer in an amount of not less than 10% by mass based on 100% by mass of a rubber component of the rubber composition, and
the silica in an amount of 10 to 70 parts by mass for each 100 parts by mass of the rubber component.

$R^{11}$ in the formula (I) is preferably a group represented by the following formula (Ia):

wherein $R^{14}$ represents a hydrocarbylene group including at least one of a structural unit derived from a conjugated diene compound and a structural unit derived from an aromatic vinyl compound; and n represents an integer of 1 to 10.

$R^{14}$ in the formula (Ia) is preferably a hydrocarbylene group including from one to ten isoprene-derived structural unit(s).

The silicon-containing vinyl compound is preferably a compound represented by the following formula (II):

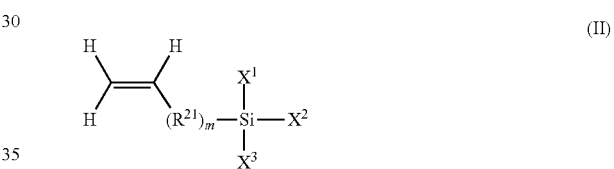

wherein m represents 0 or 1; $R^{21}$ represents a hydrocarbylene group; and $X^1$, $X^2$, and $X^3$ each represent a substituted amino group, a hydrocarbyloxy group, or an optionally substituted hydrocarbyl group.

The conjugated diene polymer preferably contains a structural unit derived from an aromatic vinyl compound.

The silica preferably has a nitrogen adsorption specific surface area of 40 to 400 $m^2/g$.

The silica preferably includes silica (1) having a nitrogen adsorption specific surface area of at least 40 $m^2/g$ but less than 120 $m^2/g$, and silica (2) having a nitrogen adsorption specific surface area of not less than 120 $m^2/g$.

The rubber composition preferably includes a liquid resin having a softening point of −20 to 20° C. in an amount of 1 to 10 parts by mass for each 100 parts by mass of the rubber component.

Preferably, the silica includes silica (1) having a nitrogen adsorption specific surface area of at least 40 $m^2/g$ but less than 120 $m^2/g$, and silica (2) having a nitrogen adsorption specific surface area of not less than 120 $m^2/g$, and the rubber composition includes a liquid resin having a softening point of −20 to 20° C. in an amount of 1 to 10 parts by mass for each 100 parts by mass of the rubber component.

The rubber composition preferably includes a mercapto group-containing silane coupling agent in an amount of 1 to 20 parts by mass for each 100 parts by mass of the silica.

Preferably, the rubber composition includes a mercapto group-containing silane coupling agent in an amount of 1 to 20 parts by mass for each 100 parts by mass of the silica, and the silica includes silica (1) having a nitrogen adsorption specific surface area of at least 40 m²/g but less than 120 m²/g, and silica (2) having a nitrogen adsorption specific surface area of not less than 120 m²/g.

The rubber composition preferably includes a mercapto group-containing silane coupling agent in an amount of 1 to 20 parts by mass for each 100 parts by mass of the silica, and a liquid resin having a softening point of −20 to 20° C. in an amount of 1 to 10 parts by mass for each 100 parts by mass of the rubber component.

Preferably, the rubber composition includes a mercapto group-containing silane coupling agent in an amount of 1 to 20 parts by mass for each 100 parts by mass of the silica, the silica includes silica (1) having a nitrogen adsorption specific surface area of at least 40 m²/g but less than 120 m²/g, and silica (2) having a nitrogen adsorption specific surface area of not less than 120 m²/g, and the rubber composition includes a liquid resin having a softening point of −20 to 20° C. in an amount of 1 to 10 parts by mass for each 100 parts by mass of the rubber component.

Preferably, the rubber composition includes a mercapto group-containing silane coupling agent in an amount of 1 to 20 parts by mass for each 100 parts by mass of the silica, and the silane coupling agent is at least one of a compound represented by the formula (1) below, and a compound containing a linking unit A represented by the formula (2) below and a linking unit B represented by the formula (3) below,

(1)

wherein $R^{101}$ to $R^{103}$ each represent a branched or unbranched $C_{1-12}$ alkyl group, a branched or unbranched $C_{1-12}$ alkoxy group, or a group represented by —O—($R^{111}$—O)$_z$—$R^{112}$ where z $R^{111}$s each represent a branched or unbranched $C_{1-30}$ divalent hydrocarbon group, and z $R^{111}$s may be the same as or different from one another; $R^{112}$ represents a branched or unbranched $C_{1-30}$ alkyl group, a branched or unbranched $C_{2-30}$ alkenyl group, a $C_{6-30}$ aryl group, or a $C_{7-30}$ aralkyl group; and z represents an integer of 1 to 30, and $R^{101}$ to $R^{103}$ may be the same as or different from one another; and $R^{104}$ represents a branched or unbranched $C_{1-6}$ alkylene group;

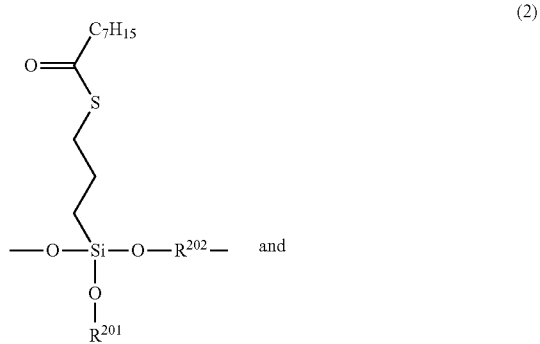

(2)

and

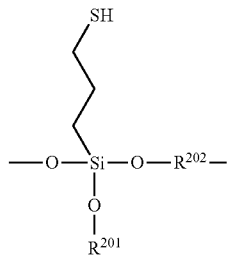

(3)

wherein $R^{201}$ represents a hydrogen atom, a halogen atom, a branched or unbranched $C_{1-30}$ alkyl group, a branched or unbranched $C_{2-30}$ alkenyl group, a branched or unbranched $C_{2-30}$ alkynyl group, or the alkyl group in which a terminal hydrogen atom is replaced with a hydroxy group or a carboxyl group; $R^{202}$ represents a branched or unbranched $C_{1-30}$ alkylene group, a branched or unbranched $C_{2-30}$ alkenylene group, or a branched or unbranched $C_{2-30}$ alkynylene group; and $R^{201}$ and $R^{202}$ may be joined together to form a cyclic structure.

Preferably, the silica includes silica (1) having a nitrogen adsorption specific surface area of at least 40 m²/g but less than 120 m²/g, and silica (2) having a nitrogen adsorption specific surface area of not less than 120 m²/g, and the nitrogen adsorption specific surface areas and amounts of the silica (1) and the silica (2) satisfy the following inequalities:

(Nitrogen adsorption specific surface area of silica (2))/(Nitrogen adsorption specific surface area of silica(1))≥1.4, and (Amount of silica(1))×0.06≤(Amount of silica(2))≤ (Amount of silica(1))×15.

The present invention also relates to a pneumatic tire, formed from the rubber composition.

Advantageous Effects of Invention

The rubber composition according to the present invention includes a specific amount of a specific conjugated diene polymer and a specific amount of silica. Thus, the rubber composition enables to provide a pneumatic tire capable of achieving a balanced improvement in fuel economy, tensile strength at break, and processability.

DESCRIPTION OF EMBODIMENTS

As used herein, a hydrocarbyl group denotes a monovalent group provided by removing one hydrogen atom from a hydrocarbon; a hydrocarbylene group denotes a divalent group provided by removing two hydrogen atoms from a hydrocarbon; a hydrocarbyloxy group denotes a monovalent group provided by replacing the hydrogen atom of a hydroxy group with a hydrocarbyl group; a substituted amino group denotes a group provided by replacing at least one hydrogen atom of an amino group with a monovalent atom other than a hydrogen atom or with a monovalent group, or denotes a group provided by replacing the two hydrogen atoms of an amino group with a divalent group; a hydrocarbyl group having a substituent (hereinafter, also referred to as substituted hydrocarbyl group) denotes a monovalent group provided by replacing at least one hydrogen atom of a hydrocarbyl group with a substituent; and a hydrocarbylene group containing a hetero atom (hereinafter, also referred to as hetero atom-containing hydrocarbylene group) denotes a divalent group provided by replacing a hydrogen atom and/or a carbon atom other than the carbon atoms from which a hydrogen atom has been removed in a hydrocarbylene group with a group containing a hetero atom (an atom other than carbon and hydrogen atoms).

The conjugated diene polymer in the present invention is obtained by polymerizing a monomer component including a conjugated diene compound and a silicon-containing vinyl compound in the presence of a polymerization initiator represented by the following formula (I):

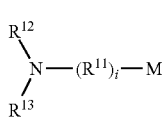

(I)

wherein i represents 0 or 1; $R^{11}$ represents a $C_{1-100}$ hydrocarbylene group; $R^{12}$ and $R^{13}$ each represent an optionally substituted hydrocarbyl group or a trihydrocarbylsilyl group, or $R^{12}$ and $R^{13}$ are bonded to each other to form a hydrocarbylene group optionally containing at least one, as a hetero atom, selected from the group consisting of a silicon atom, a nitrogen atom, and an oxygen atom; and M represents an alkali metal atom, to produce a copolymer, and then reacting a compound containing a nitrogen atom and/or a silicon atom with an active terminal of the copolymer.

As used herein, the term "modifying" means bonding a copolymer including a diene compound alone or with an aromatic vinyl compound, to a compound other than the compounds. The above conjugated diene polymer has a structure in which the polymerization initiation terminal is modified by a polymerization initiator represented by the formula (I); the main chain is modified by copolymerization with a silicon-containing vinyl compound; and the termination terminal is modified by a compound containing a nitrogen atom and/or a silicon atom a silicon-containing vinyl compound. The use of the conjugated diene polymer in a rubber component enables to disperse silica well and achieve a balanced improvement in fuel economy, tensile strength at break, and processability. In general, the use of a modified rubber in which all of the initiation terminal, main chain and termination terminal are modified tends to greatly deteriorate processability. In contrast, the use of the conjugated diene polymer in which the initiation terminal, main chain and termination terminal are modified by the respective specific compounds ensures good processability and, at the same time, makes it possible to synergistically enhance the effects of improving fuel economy and tensile strength at break.

Therefore, balanced improvements in fuel economy, tensile strength at break, and processability can be achieved at high levels.

In the formula (I), i is 0 or 1, preferably 1.

$R^{11}$ in the formula (I) is a $C_{1-100}$ hydrocarbylene group, preferably a $C_{6-100}$ hydrocarbylene group, and more preferably a $C_{7-80}$ hydrocarbylene group. If $R^{11}$ has more than 100 carbon atoms, the polymerization initiator has an increased molecular weight, which may reduce the cost efficiency and the workability during the polymerization.

Plural kinds of compounds differing in the carbon number of $R^{11}$ may be used in combination as the polymerization initiator represented by the formula (I).

$R^{11}$ in the formula (I) is preferably a group represented by the following formula (Ia):

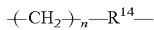

(Ia)

wherein $R^{14}$ represents a hydrocarbylene group including a structural unit derived from a conjugated diene compound and/or a structural unit derived from an aromatic vinyl compound; and n represents an integer of 1 to 10.

$R^{14}$ in the formula (Ia) represents a hydrocarbylene group including a structural unit derived from a conjugated diene compound and/or a structural unit derived from an aromatic vinyl compound, preferably a hydrocarbylene group including an isoprene-derived structural unit, and more preferably a hydrocarbylene group including from one to ten isoprene-derived structural unit(s).

The number of the structural unit derived from a conjugated diene compound and/or the structural unit derived from an aromatic vinyl compound in $R^{14}$ preferably ranges from one to ten, more preferably from one to five.

In the formula (Ia), n represents an integer of 1 to 10, preferably an integer of 2 to 4.

Examples of $R^{11}$ include a group obtained by bonding from one to ten isoprene-derived structural unit(s) and a methylene group, a group obtained by bonding from one to ten isoprene-derived structural unit(s) and an ethylene group, and a group obtained by bonding from one to ten isoprene-derived structural unit(s) and a trimethylene group, preferably a group obtained by bonding from one to ten isoprene-derived structural unit(s) and a trimethylene group.

In the formula (I), $R^{12}$ and $R^{13}$ each represent an optionally substituted hydrocarbyl group or a trihydrocarbylsilyl group, or $R^{12}$ and $R^{13}$ are bonded to each other to form a hydrocarbylene group optionally containing an atom, as a hetero atom, selected from the group consisting of a silicon atom, a nitrogen atom, and an oxygen atom.

The optionally substituted hydrocarbyl group refers to a hydrocarbyl group or substituted hydrocarbyl group. The substituent in the substituted hydrocarbyl group may be a substituted amino group or a hydrocarbyloxy group. Examples of the hydrocarbyl groups include acyclic alkyl groups such as a methyl group, an ethyl group, an n-propyl group, an isopropyl group, an n-butyl group, an isobutyl group, a sec-butyl group, a tert-butyl group, an n-pentyl group, an n-hexyl group, an n-octyl group, and an n-dodecyl group; cyclic alkyl groups such as a cyclopentyl group and a cyclohexyl group; and aryl groups such as a phenyl group and a benzyl group, preferably acyclic alkyl groups, and more preferably acyclic alkyl groups. Examples of the substituted hydrocarbyl groups in which the substituent is a substituted amino group include an N,N-dimethylaminomethyl group, a 2-N,N-dimethylaminoethyl group, and a 3-N,N-dimethylaminopropyl group. Examples of the substituted hydrocarbyl groups in which the substituent is a hydrocarbyloxy group include a methoxymethyl group, a methoxyethyl group, and an ethoxymethyl group. Preferred among the above examples are hydrocarbyl groups, more preferably $C_{1-4}$ acyclic alkyl groups, and still more preferably a methyl group or an ethyl group.

Examples of the trihydrocarbylsilyl groups include a trimethylsilyl group, and a tert-butyl-dimethylsilyl group. A trimethylsilyl group is preferred.

The hydrocarbylene group optionally containing at least one, as a hetero atom, selected from the group consisting of a silicon atom, a nitrogen atom, and an oxygen atom refers to a hydrocarbylene group, or a hetero atom-containing hydrocarbylene group in which the hetero atom is at least one selected from the group consisting of a silicon atom, a nitrogen atom and an oxygen atom. Examples of the hetero atom-containing hydrocarbylene groups in which the hetero atom is at least one selected from the group consisting of a silicon atom, a nitrogen atom and an oxygen atom include hetero atom-containing hydrocarbylene groups in which the hetero atom is a silicon atom, hetero atom-containing hydrocarbylene groups in which the hetero atom is a nitrogen atom, and hetero atom-containing hydrocarbylene groups in which the hetero atom is an oxygen atom. Examples of the hydrocarbylene groups include alkylene groups such as a tetramethylene group, a pentamethylene group, a hexamethylene group, a pent-2-ene-1,5-diyl group, and a 2,2,4-trimethylhexane-1,6-diyl group; and alkenediyl groups such as a pent-2-ene-1,5-diyl group, preferably alkylene groups, and more preferably $C_{4-7}$ alkylene groups. Examples of the hetero atom-containing hydrocarbylene groups in which the hetero atom is a silicon atom include a group represented by —Si(CH$_3$)$_2$—CH$_2$—CH$_2$—Si(CH$_3$)$_2$—. Examples of the hetero atom-containing hydrocarbylene groups in which the hetero atom is a nitrogen atom include a group represented by —CH=N—CH=CH— and a group represented by —CH=N—CH$_2$—CH$_2$—. Examples of the hetero atom-containing hydrocarbylene groups in which the hetero atom is an oxygen atom include a group represented by —CH$_2$—CH$_2$—O—CH$_2$—CH$_2$—. Preferred among the above examples are hydrocarbylene groups, more preferably $C_{4-7}$ alkylene groups, and still more preferably a tetramethylene group, a pentamethylene group, or a hexamethylene group.

Preferably, each of $R^{12}$ and $R^{13}$ is a hydrocarbyl group, or $R^{12}$ and $R^{13}$ are bonded to each other to form a hydrocarbylene group. More preferably, each of $R^{12}$ and $R^{13}$ is a $C_{1-4}$ acyclic alkyl group, or $R^{12}$ and $R^{13}$ are bonded to each other to form a $C_{4-7}$ alkylene group. Still more preferably, each of $R^{12}$ and $R^{13}$ is a methyl group or an ethyl group.

M in the formula (I) represents an alkali metal atom. Examples of the alkali metal atoms include Li, Na, K, and Cs, preferably Li.

The polymerization initiator represented by the formula (I) in which i is 1 may be a compound formed from one to five isoprene-derived structural unit(s) polymerized with an aminoalkyllithium compound. Examples of the aminoalkyllithium compounds include N,N-dialkylaminoalkyllithiums such as 3-(N,N-dimethylamino)-1-propyllithium, 3-(N,N-diethylamino)-1-propyllithium, 3-(N,N-di-n-butylamino)-1-propyllithium, 4-(N,N-dimethylamino)-1-butyllithium, 4-(N,N-diethylamino)-1-butyllithium, 4-(N,N-di-n-propylamino)-1-butyllithium, and 3-(N,N-di-n-butylamino)-1-butyllithium; hetero atom-free cyclic aminoalkyllithium compounds such as 3-(1-pyrrolidino)-1-propyllithium, 3-(1-piperidino)-1-propyllithium, 3-(1-hexamethyleneimino)-1-propyllithium, and 3-[1-(1,2,3,6-tetrahydropyridino)]-1-propyllithium; and hetero atom-containing cyclic aminoalkyllithium compounds such as 3-(1-morpholino)-1-propyllithium, 3-(1-imidazolyl)-1-propyllithium, 3-(4,5-dihydro-1-imidazolyl)-1-propyllithium, and 3-(2,2,5,5-tetramethyl-1-aza-2,5-disila-1-cyclopentyl)-1-propyllithium, preferably N,N-dialkylaminoalkyllithiums, and more preferably 3-(N,N-dimethylamino)-1-propyllithium or 3-(N,N-diethylamino)-1-propyllithium.

Examples of the polymerization initiators represented by the formula (I) in which i is 0 include lithium hexamethyleneimide, lithium pyrrolidide, lithium piperidide, lithium heptamethyleneimide, lithium dodecamethyleneimide, lithium dimethylamide, lithium diethylamide, lithium dipropylamide, lithium dibutylamide, lithium dihexylamide, lithium diheptylamide, lithium dioctylamide, lithium di-2-ethylhexylamide, lithium didecylamide, lithium-N-methylpiperadide, lithium ethylpropylamide, lithium ethylbutylamide, lithium methylbutylamide, lithium ethylbenzylamide, and lithium methylphenethylamide.

The polymerization initiator represented by the formula (I) in which i is 0 may be prepared in advance from a secondary amine and a hydrocarbyllithium compound before it is used in the polymerization reaction, or may be formed in the polymerization system. Examples of the secondary amines include dimethylamine, diethylamine, dibutylamine, dioctylamine, dicyclohexylamine, and diisobutylamine. Other examples thereof include cyclic amines such as azacycloheptane (i.e. hexamethyleneimine), 2-(2-ethylhexyl)pyrrolidine, 3-(2-propyl)pyrrolidine, 3,5-bis(2-ethylhexyl)piperidine, 4-phenylpiperidine, 7-decyl-1-azacyclotridecane, 3,3-dimethyl-1-azacyclotetradecane, 4-dodecyl-1-azacyclooctane, 4-(2-phenylbutyl)-1-azacyclooctane, 3-ethyl-5-cyclohexyl-1-azacycloheptane, 4-hexyl-1-azacycloheptane, 9-isoamyl-1-azacycloheptadecane, 2-methyl-1-azacycloheptadec-9-ene, 3-isobutyl-1-azacyclododecane, 2-methyl-7-t-butyl-1-azacyclododecane, 5-nonyl-1-azacyclododecane, 8-(4-methylphenyl)-5-pentyl-3-azabicyclo[5.4.0]undecane, 1-butyl-6-azabicyclo[3.2.1]octane, 8-ethyl-3-azabicyclo[3.2.1]octane, 1-propyl-3-azabicyclo[3.2.2]nonane, 3-(t-butyl)-7-azabicyclo[4.3.0]nonane, and 1,5,5-trimethyl-3-azabicyclo[4.4.0]decane.

The polymerization initiator represented by the formula (I) is preferably a compound in which i is 1, more preferably a compound formed from one to five isoprene-derived structural unit(s) polymerized with an N,N-aminoalkyllithium, and still more preferably a compound formed from one to five isoprene-derived structural unit(s) polymerized with 3-(N,N-dimethylamino)-1-propyllithium or 3-(N,N-diethylamino)-1-propyllithium.

The amount of the polymerization initiator represented by the formula (I) to be used is preferably 0.01 to 15 mmol, and more preferably 0.1 to 10 mmol, for each 100 g of the monomer component used in the polymerization.

In the present invention, other polymerization initiators, such as n-butyllithium, may be used in combination, if necessary.

Examples of the conjugated diene compounds include 1,3-butadiene, isoprene, 1,3-pentadiene, 2,3-dimethyl-1,3-butadiene, 1,3-hexadiene, and myrcene. These may be used alone, or two or more of these may be used in combination. In view of easy availability, the conjugated diene compound is preferably 1,3-butadiene or isoprene.

The silicon-containing vinyl compound is preferably a compound represented by the following formula (II):

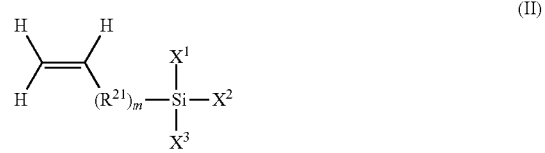

(II)

wherein m represents 0 or 1; $R^{21}$ represents a hydrocarbylene group; and $X^1$, $X^2$, and $X^3$ each represent a substituted amino group, a hydrocarbyloxy group, or an optionally substituted hydrocarbyl group.

In the formula (II), m represents 0 or 1, preferably 0.

The hydrocarbylene group in the formula (II) may be an alkylene group, an alkenediyl group, an arylene group, or a group in which an arylene group and an alkylene group are bonded. Examples of the alkylene groups include a methylene group, an ethylene group, and a trimethylene group. Examples of the alkenediyl groups include a vinylene group and an ethylene-1,1-diyl group. Examples of the arylene groups include a phenylene group, a naphthylene group, and a biphenylene group. Examples of the groups in which an arylene group and an alkylene group are bonded include a group in which a phenylene group and a methylene group are bonded, and a group in which a phenylene group and an ethylene group are bonded.

$R^{21}$ is preferably an arylene group, and more preferably a phenylene group.

In the formula (II), $X^1$, $X^2$ and $X^3$ each represent a substituted amino group, a hydrocarbyloxy group, or an optionally substituted hydrocarbyl group. Preferably, at least one of $X^1$, $X^2$ and $X^3$ is a substituted amino group. More preferably, two of $X^1$, $X^2$ and $X^3$ are substituted amino groups.

In the formula (II), the substituted amino group is preferably a group represented by the following formula (IIa):

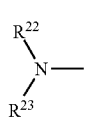

(IIa)

wherein $R^{22}$ and $R^{23}$ each represent an optionally substituted hydrocarbyl group or a trihydrocarbylsilyl group, or $R^{22}$ and $R^{23}$ are bonded to each other to form a hydrocarbylene group optionally containing a nitrogen atom and/or an oxygen atom as a hetero atom.

The optionally substituted hydrocarbyl group in the formula (IIa) refers to a hydrocarbyl group or a substituted hydrocarbyl group. The substituted hydrocarbyl group may be a substituted hydrocarbyl group in which the substituent is a hydrocarbyloxy group. Examples of the hydrocarbyl groups include acyclic alkyl groups such as a methyl group, an ethyl group, an n-propyl group, an isopropyl group, an n-butyl group, an isobutyl group, a sec-butyl group, a tert-butyl group, an n-pentyl group, an n-hexyl group, and an n-octyl group; cyclic alkyl groups such as a cyclopentyl group and a cyclohexyl group; and aryl groups such as a phenyl group, a benzyl group, and a naphthyl group, preferably acyclic alkyl groups, and more preferably a methyl group or an ethyl group. Examples of the substituted hydrocarbyl groups in which the substituent is a hydrocarbyloxy group include alkoxyalkyl groups such as a methoxymethyl group, an ethoxymethyl group, and a methoxyethyl group; and aryloxyalkyl groups such as a phenoxymethyl group.

Examples of the trihydrocarbylsilyl group in the formula (IIa) include trialkylsilyl groups such as a trimethylsilyl group, a triethylsilyl group, and a tert-butyldimethylsilyl group.

The hydrocarbylene group optionally containing a nitrogen atom and/or an oxygen atom as a hetero atom in the formula (IIa) refers to a hydrocarbylene group, or a hetero atom-containing hydrocarbylene group in which the hetero atom is a nitrogen atom and/or an oxygen atom. The hetero atom-containing hydrocarbylene group in which the hetero atom is a nitrogen atom and/or an oxygen atom may be a hydrocarbylene group containing a nitrogen atom as a hetero atom, or a hydrocarbylene group containing an oxygen atom as a hetero atom. Examples of the hydrocarbylene groups include alkylene groups such as a trimethylene group, a tetramethylene group, a pentamethylene group, a hexamethylene group, a heptamethylene group, an octamethylene group, a decamethylene group, a dodecamethylene group, and a 2,2,4-trimethylhexane-1,6-diyl group; and alkenediyl groups such as a pent-2-ene-1,5-diyl group. Examples of the hetero atom-containing hydrocarbylene groups in which the hetero atom is a nitrogen atom include a group represented by —CH=N—CH=CH— and a group represented by —CH=N—CH$_2$—CH$_2$—. Examples of the hetero atom-containing hydrocarbylene groups in which the hetero atom is an oxygen atom include a group represented by —CH$_2$—CH$_2$—O—CH$_2$—CH$_2$—.

Preferably, each of $R^{22}$ and $R^{23}$ is an alkyl group, or $R^{22}$ and $R^{23}$ are bonded to each other to form an alkylene group. Each of $R^{22}$ and $R^{23}$ is more preferably an alkyl group, and still more preferably a methyl group or an ethyl group.

Examples of the substituted amino groups represented by the formula (IIa) in which $R^{22}$ and $R^{23}$ are hydrocarbyl groups include dialkylamino groups such as a dimethylamino group, a diethylamino group, an ethylmethylamino group, a di-n-propylamino group, a diisopropylamino group, a di-n-butylamino group, a diisobutylamino group, a di-sec-butylamino group, and a di-tert-butylamino group; and diarylamino groups such as a diphenylamino group, preferably dialkylamino groups, and more preferably a dimethylamino group, a diethylamino group, or a di-n-butylamino group. Examples of the substituted amino groups in which $R^{22}$ and $R^{23}$ are substituted hydrocarbyl groups in which the substituent is a hydrocarbyloxy group include di(alkoxyalkyl)amino groups such as a di(methoxymethyl)amino group and a di(ethoxymethyl)amino group. Examples of the substituted amino groups in which $R^{22}$ or $R^{23}$ is a trihydrocarbylsilyl group include trialkylsilyl group-containing amino groups such as a bis(trimethylsilyl)amino group, a bis(tert-butyldimethylsilyl) amino group, and an N-trimethylsilyl-N-methylamino group.

Examples of the substituted amino groups represented by the formula (IIa) in which $R^{22}$ and $R^{23}$ are bonded to each other to form a hydrocarbylene group include 1-alkyleneimino groups such as a 1-trimethyleneimino group, a 1-pyrrolidino group, a 1-piperidino group, a 1-hexamethyleneimino group, a 1-heptamethyleneimino group, a 1-octamethyleneimino group, a 1-decamethyleneimino group, and a 1-dodecamethyleneimino group. Examples of the substituted amino groups in which $R^{22}$ and $R^{23}$ are bonded to each other to form a hydrocarbylene group containing a nitrogen atom as a hetero atom include a 1-imidazolyl group and a 4,5-dihydro-1-imidazolyl group. Examples of the substituted amino groups in which $R^{22}$ and $R^{23}$ are bonded to each other to form a hydrocarbylene group containing an oxygen atom as a hetero atom include a morpholino group.

The substituted amino group represented by the formula (IIa) is preferably a dialkylamino group or a 1-alkyleneimino group, more preferably a dialkylamino group, and still more preferably a dimethylamino group, a diethylamino group, or a di-n-butylamino group.

Examples of the hydrocarbyloxy group in the formula (II) include alkoxy groups such as a methoxy group, an ethoxy group, an n-propoxy group, an isopropoxy group, an n-butoxy group, a sec-butoxy group, and a tert-butoxy group; and aryloxy groups such as a phenoxy group and a benzyloxy group.

The optionally substituted hydrocarbyl group in the formula (II) refers to a hydrocarbyl group or a substituted hydrocarbyl group. The substituted hydrocarbyl group may be a substituted hydrocarbyl group in which the substituent is a hydrocarbyloxy group. Examples of the hydrocarbyl groups include alkyl groups such as a methyl group, an ethyl group, an n-propyl group, an isopropyl group, an n-butyl group, a sec-butyl group, and a tert-butyl group; and aryl groups such as a phenyl group, a 4-methyl-1-phenyl group, and a benzyl group. Examples of the substituted hydrocarbyl groups in which the substituent is a hydrocarbyloxy group include alkoxyalkyl groups such as a methoxymethyl group, an ethoxymethyl group, and an ethoxyethyl group.

Examples of the silicon-containing vinyl compounds represented by the formula (II) in which one of $X^1$, $X^2$, and $X^3$ is a substituted amino group, and m is 0 include: (dialkylamino)dialkylvinylsilanes such as (dimethylamino)dimethylvinylsilane, (ethylmethylamino)dimethylvinylsilane, (di-n-propylamino)dimethylvinylsilane, (diisopropylamino)dimethylvinylsilane, (dimethylamino)diethylvinylsilane, (ethylmethylamino)diethylvinylsilane, (di-n-propylamino)diethylvinylsilane, and (diisopropylamino)diethylvinylsilane; [bis(trialkylsilyl)amino]dialkylvinylsilanes such as [bis(trimethylsilyl)amino]dimethylvinylsilane, [bis(t-butyldimethylsilyl)amino]dimethylvinylsilane, [bis(trimethylsilyl)amino]diethylvinylsilane, and [bis(t-butyldimethylsilyl)amino]diethylvinylsilane; (dialkylamino)di(alkoxyalkyl)vinylsilanes such as (dimethylamino)di(methoxymethyl)vinylsilane, (dimethylamino)di(methoxyethyl)vinylsilane, (dimethylamino)di(ethoxymethyl)vinylsilane, (dimethylamino)di(ethoxyethyl)vinylsilane, (diethylamino)di(methoxymethyl)vinylsilane, (diethylamino)di(methoxyethyl)vinylsilane, (diethylamino)di(ethoxymethyl)vinylsilane, and (diethylamino)di(ethoxyethyl)vinylsilane; and cyclic aminodialkylvinylsilane compounds such as pyrrolidinodimethylvinylsilane, piperidinodimethylvinylsilane, hexamethyleneiminodimethylvinylsilane, 4,5-dihydroimidazolyldimethylvinylsilane, and morpholinodimethylvinylsilane.

Examples of the silicon-containing vinyl compounds represented by the formula (II) in which one of $X^1$, $X^2$, and $X^3$ is a substituted amino group, and m is 1 include (dialkylamino)dialkylvinylphenylsilanes such as (dimethylamino)dimethyl-4-vinylphenylsilane, (dimethylamino)dimethyl-3-vinylphenylsilane, (diethylamino)dimethyl-4-vinylphenylsilane, (diethylamino)dimethyl-3-vinylphenylsilane, (di-n-propylamino)dimethyl-4-vinylphenylsilane, (di-n-propylamino)dimethyl-3-vinylphenylsilane, (di-n-butylamino)dimethyl-4-vinylphenylsilane, (di-n-butylamino)dimethyl-3-vinylphenylsilane, (dimethylamino)diethyl-4-vinylphenylsilane, (dimethylamino)diethyl-3-vinylphenylsilane, (diethylamino)diethyl-4-vinylphenylsilane, (diethylamino)diethyl-3-vinylphenylsilane, (di-n-propylamino)diethyl-4-vinylphenylsilane, (di-n-propylamino)diethyl-3-vinylphenylsilane, (di-n-butylamino)diethyl-4-vinylphenylsilane, and (di-n-butylamino)diethyl-3-vinylphenylsilane.

Examples of the silicon-containing vinyl compounds represented by the formula (II) in which two of $X^1$, $X^2$, and $X^3$ are substituted amino groups, and m is 0 include: bis(dialkylamino)alkylvinylsilanes such as bis(dimethylamino)methylvinylsilane, bis(diethylamino)methylvinylsilane, bis(di-n-propylamino)methylvinylsilane, bis(di-n-butylamino)methylvinylsilane, bis(dimethylamino)ethylvinylsilane, bis(diethylamino)ethylvinylsilane, bis(di-n-propylamino)ethylvinylsilane, and bis(di-n-butylamino)ethylvinylsilane; bis[bis(trialkylsilyl)amino]alkylvinylsilanes such as bis[bis(trimethylsilyl)amino]methylvinylsilane, bis[bis(tert-butyldimethylsilyl)amino]methylvinylsilane, bis[bis(trimethylsilyl)amino]ethylvinylsilane, and bis[bis(tert-butyldimethylsilyl)amino]ethylvinylsilane; bis(dialkylamino)alkoxyalkylsilanes such as bis(dimethylamino)methoxymethylvinylsilane, bis(dimethylamino)methoxyethylvinylsilane, bis(dimethylamino)ethoxymethylvinylsilane, bis(dimethylamino)ethoxyethylvinylsilane, bis(diethylamino)methoxymethylvinylsilane, bis(diethylamino)methoxyethylvinylsilane, bis(diethylamino)ethoxymethylvinylsilane, and bis(diethylamino)ethoxyethylvinylsilane; and bis(cyclic amino)alkylvinylsilane compounds such as bis(pyrrolidino)methylvinylsilane, bis(piperidino)methylvinylsilane, bis(hexamethyleneimino)methylvinylsilane, bis(4,5-dihydroimidazolyl)methylvinylsilane, and bis(morpholino)methylvinylsilane.

Examples of the silicon-containing vinyl compounds represented by the formula (II) in which two of $X^1$, $X^2$, and $X^3$ are substituted amino groups, and m is 1 include bis(dialkylamino)alkylvinylphenylsilanes such as bis(dimethylamino)methyl-4-vinylphenylsilane, bis(dimethylamino)methyl-3-vinylphenylsilane, bis(diethylamino)methyl-4-vinylphenylsilane, bis(diethylamino)methyl-3-vinylphenylsilane, bis(di-n-propylamino)methyl-4-vinylphenylsilane, bis(di-n-propylamino)methyl-3-vinylphenylsilane, bis(di-n-butylamino)methyl-4-vinylphenylsilane, bis(di-n-butylamino)methyl-3-vinylphenylsilane, bis(dimethylamino)ethyl-4-vinylphenylsilane, bis(dimethylamino)ethyl-3-vinylphenylsilane, bis(diethylamino)ethyl-4-vinylphenylsilane, bis(diethylamino)ethyl-3-vinylphenylsilane, bis(di-n-propylamino)ethyl-4-vinylphenylsilane, bis(di-n-propylamino)ethyl-3-vinylphenylsilane, bis(di-n-butylamino)ethyl-4-vinylphenylsilane, and bis(di-n-butylamino)ethyl-3-vinylphenylsilane.

Examples of the silicon-containing vinyl compounds represented by the formula (II) in which the three of $X^1$, $X^2$, and $X^3$ are substituted amino groups, and m is 0 include tris(dialkylamino)vinylsilanes such as tris(dimethylamino)vinylsilane, tris(diethylamino)vinylsilane, tris(di-n-propylamino)vinylsilane, and tris(di-n-butylamino)vinylsilane.

Examples of the silicon-containing vinyl compounds represented by the formula (II) in which the three of $X^1$, $X^2$, and $X^3$ are substituted amino groups, and m is 1 include tris(dialkylamino)vinylphenylsilanes such as tris(dimethylamino)-4-vinylphenylsilane, tris(dimethylamino)-3-vinylphenylsilane, tris(diethylamino)-4-vinylphenylsilane, tris(diethylamino)-3-vinylphenylsilane, tris(di-n-propylamino)-4-vinylphenylsilane, tris(di-n-propylamino)-3-vinylphenylsilane, tris(di-n-butylamino)-4-vinylphenylsilane, and tris(di-n-butylamino)-3-vinylphenylsilane.

Examples of the silicon-containing vinyl compounds represented by the formula (II) in which each of $X^1$, $X^2$, and $X^3$ is not a substituted amino group, and m is 0 include: trialkoxyvinylsilanes such as trimethoxyvinylsilane, triethoxyvinylsilane, and tripropoxyvinylsilane; dialkoxyalkylvinylsilanes such as methyldimethoxyvinylsilane and methyldiethoxyvinylsilane; dialkoxyarylvinylsilanes such as di(tert-pentoxy)phenylvinylsilane and di(tert-butoxy)phenylvinylsilane; monoalkoxydialkylvinylsilanes such as dimethylmethoxyvinylsilane; monoalkoxydiarylvinylsilanes such as tert-butoxydiphenylvinylsilane and tert-pentoxydiphenylvinylsilane; monoalkoxyalkylarylvinylsilanes such as tert-butoxymethylphenylvinylsilane and tert-butoxyethylphenylvinylsilane; and substituted alkoxyvinylsilane compounds such as tris(β-methoxyethoxy)vinylsilane.

Other examples of the silicon-containing vinyl compounds include bis(trialkylsilyl)aminostyrenes such as 4-N,N-bis(trimethylsilyl)aminostyrene and 3-N,N-bis(trimethylsilyl)aminostyrene; and bis(trialkylsilyl)aminoalkylstyrenes such as 4-bis(trimethylsilyl)aminomethylstyrene, 3-bis(trimethylsilyl)aminomethylstyrene, 4-bis(trimethylsilyl)aminoethylstyrene, and 3-bis(trimethylsilyl)aminoethylstyrene.

The silicon-containing vinyl compound is preferably a compound represented by the formula (II), more preferably a compound represented by the formula (II) in which m is 0, and still more preferably a compound represented by the formula (II) in which two of $X^1$, $X^2$ and $X^3$ are dialkylamino groups.

The silicon-containing vinyl compound is particularly preferably bis(dimethylamino)methylvinylsilane, bis(diethylamino)methylvinylsilane, or bis(di-n-butylamino)methylvinylsilane.

The amount of the silicon-containing vinyl compound used in the production of the conjugated diene polymer is preferably not less than 0.01% by mass, more preferably not less than 0.02% by mass, and still more preferably not less than 0.05% by mass, based on 100% by mass of the total amount of the monomer component used in the polymerization in terms of achieving a balanced enhancement in fuel economy, tensile strength at break, and processability. The amount is preferably not more than 20% by mass, more preferably not more than 2% by mass, and still more preferably not more than 1% by mass, in terms of increasing cost efficiency and tensile strength at break.

In the production of the conjugated diene polymer, the monomer component may further include polymerizable monomers, in addition to the conjugated diene compound and silicon-containing vinyl compound. Examples of these monomers include aromatic vinyl compounds, vinyl nitriles, and unsaturated carboxylic acid esters. Examples of the aromatic vinyl compounds include styrene, α-methylstyrene, vinyltoluene, vinylnaphthalene, divinylbenzene, trivinylbenzene, and divinylnaphthalene. Examples of the vinyl nitriles include acrylonitrile. Examples of the unsaturated carboxylic acid esters include methyl acrylate, ethyl acrylate, methyl methacrylate, and ethyl methacrylate. Preferred among the above examples are aromatic vinyl compounds, more preferably styrene.

In the case where an aromatic vinyl compound is used in the production of the conjugated diene polymer, the amount of the aromatic vinyl compound based on 100% by mass of the combined amount of the conjugated diene compound and the aromatic vinyl compound is preferably not less than 10% by mass (the amount of the conjugated diene compound is not more than 90% by mass), and more preferably not less than 15% by mass (the amount of the conjugated diene compound is not more than 85% by mass). Moreover, from the viewpoint of fuel economy, the amount of the aromatic vinyl compound is preferably not more than 50% by mass (the amount of the conjugated diene compound is not less than 50% by mass), and more preferably not more than 45% by mass (the amount of the conjugated diene compound is not less than 55% by mass).

In the production of the conjugated diene polymer, polymerization is preferably performed in a hydrocarbon solvent. The hydrocarbon solvent does not inactivate the polymerization initiator represented by the formula (I). Examples of the hydrocarbon solvents include aliphatic hydrocarbons, aromatic hydrocarbons, and alicyclic hydrocarbons. Examples of the aliphatic hydrocarbons include propane, n-butane, iso-butane, n-pentane, iso-pentane, n-hexane, n-heptane, and n-octane. Examples of the aromatic hydrocarbons include benzene, toluene, xylene, and ethylbenzene. Examples of the alicyclic hydrocarbons include cyclopentane and cyclohexane. The hydrocarbon solvent may be a mixture of different components, such as industrial hexane. It is preferably a $C_{2-12}$ hydrocarbon.

The polymerization reaction may be performed in the presence of an agent for adjusting the vinyl bond content in conjugated diene units, or an agent for adjusting the distributions of a conjugated diene unit and a monomer unit based on a monomer other than conjugated dienes in conjugated diene polymer chains (hereinafter, referred to collectively as "adjusting agents"). Examples of the agents include ether compounds, tertiary amine compounds, and phosphine compounds. Examples of the ether compounds include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; and aromatic ethers such as diphenyl ether and anisole. Examples of the tertiary amine compounds include triethylamine, tripropylamine, tributylamine, N,N,N',N'-tetramethylethylenediamine, N,N-diethylaniline, pyridine, and quinoline. Examples of the phosphine compounds include trimethylphosphine, triethylphosphine, and triphenylphosphine. One or more of them may be used.

In the production of the conjugated diene polymer, the polymerization initiator may be supplied to a polymerization reactor before the monomer component is supplied to the polymerization reactor; or the polymerization initiator may be supplied to a polymerization reactor after the whole amount of the monomer component used in the polymerization is supplied to the polymerization reactor; or the polymerization initiator may be supplied to a polymerization reactor after a part of the monomer component used in the polymerization is supplied to the polymerization reactor. Moreover, the polymerization initiator may be supplied at once or continuously to the polymerization reactor.

In the production of the conjugated diene polymer, the monomer component may be supplied at once, continuously, or intermittently to the polymerization reactor. Moreover, monomers may be supplied individually or simultaneously to the polymerization reactor.

In the production of the conjugated diene polymer, the polymerization temperature is usually 25 to 100° C., preferably 35 to 90° C., and more preferably 50 to 80° C. The polymerization time usually ranges from 10 minutes to 5 hours.

The conjugated diene polymer is obtained by polymerizing a monomer component including a conjugated diene compound and a silicon-containing vinyl compound in the presence of a polymerization initiator represented by the formula (I) to produce a copolymer, and then reacting a compound containing a nitrogen atom and/or a silicon atom with an active terminal of the copolymer (the active terminal of the copolymer is considered to contain an alkali metal derived from the polymerization initiator) (terminal modification reaction). More specifically, the conjugated diene polymer is obtained by adding the compound containing a nitrogen atom and/or a silicon atom to the polymerization solution and then mixing them. The amount of the compound containing a nitrogen atom and/or a silicon atom to be added to the polymerization solution is usually 0.1 to 3 mol, preferably 0.5 to 2 mol, and more preferably 0.7 to 1.5 mol, per mol of the alkali metal derived from the polymerization initiator represented by the formula (I).

The terminal modification reaction is usually performed at a temperature of 25 to 100° C., preferably 35 to 90° C., and more preferably 50 to 80° C. The time period for the reaction is usually 60 seconds to 5 hours, preferably 5 minutes to 1 hour, and more preferably 15 minutes to 1 hour.

Preferred examples of the compound containing a nitrogen atom and/or a silicon atom include compounds containing a nitrogen atom and a carbonyl group.

The compound containing a nitrogen atom and a carbonyl group is preferably a compound represented by the following formula (III):

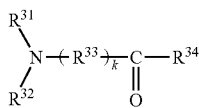
(III)

wherein $R^{31}$ represents an optionally substituted hydrocarbyl group, or is joined to $R^{32}$ to form a hydrocarbylene group optionally containing a nitrogen atom and/or an oxygen atom as a hetero atom, or is joined to $R^{34}$ to form a divalent group; $R^{32}$ represents an optionally substituted hydrocarbyl group, or is joined to $R^{31}$ to form a hydrocarbylene group optionally containing a nitrogen atom and/or an oxygen atom as a hetero atom; and $R^{34}$ represents an optionally substituted hydrocarbyl group or a hydrogen atom, or is joined to $R^{31}$ to form a divalent group; $R^{33}$ represents a divalent group; and k represents 0 or 1.

In the formula (III), the optionally substituted hydrocarbyl group for $R^{31}$, $R^{32}$ or $R^{34}$ refers to a hydrocarbyl group or a substituted hydrocarbyl group. The substituted hydrocarbyl group may be a substituted hydrocarbyl group in which the substituent is a hydrocarbyloxy group, or a substituted hydrocarbyl group in which the substituent is a substituted amino group. Examples of the hydrocarbyl groups include alkyl groups such as a methyl group, an ethyl group, an n-propyl group, an isopropyl group, and an n-butyl group; alkenyl groups such as a vinyl group, an allyl group, and an isopropenyl group; and aryl groups such as a phenyl group. Examples of the substituted hydrocarbyl groups in which the substituent is a hydrocarbyloxy group include alkoxyalkyl groups such as a methoxymethyl group, an ethoxymethyl group, and an ethoxyethyl group. Examples of the substituted hydrocarbyl groups in which the substituent is a substituted amino group include (N,N-dialkylamino)alkyl groups such as a 2-(N,N-dimethylamino) ethyl group, a 2-(N,N-diethylamino)ethyl group, a 3-(N,N-dimethylamino)propyl group, and a 3-(N,N-diethylamino)propyl group; (N,N-dialkylamino)aryl groups such as a 4-(N,N-dimethylamino)phenyl group, a 3-(N,N-dimethylamino)phenyl group, a 4-(N,N-diethylamino)phenyl group, and a 3-(N,N-diethylamino)phenyl group; (N,N-dialkylamino)alkylaryl groups such as a 4-(N,N-dimethylamino)methylphenyl group and a 4-(N,N-dimethylamino)ethylphenyl group; cyclic amino group-containing alkyl groups such as a 3-pyrrolidinopropyl group, a 3-piperidinopropyl group, and a 3-imidazolylpropyl group; cyclic amino group-containing aryl groups such as a 4-pyrrolidinophenyl group, a 4-piperidinophenyl group, and a 4-imidazolylphenyl group; and cyclic amino group-containing alkylaryl groups such as a 4-pyrrolidinoethylphenyl group, a 4-piperidinoethylphenyl group, and a 4-imidazolylethylphenyl group.

In the formula (III), the hydrocarbylene group optionally containing a nitrogen atom and/or an oxygen atom as a hetero atom, formed by joining $R^{31}$ and $R^{32}$ refers to a hydrocarbylene group or a hetero atom-containing hydrocarbylene group in which the hetero atom is a nitrogen atom and/or an oxygen atom. The hetero atom-containing hydrocarbylene group in which the hetero atom is a nitrogen atom and/or an oxygen atom may be a hetero atom-containing hydrocarbylene group in which the hetero atom is a nitrogen atom, or a hetero atom-containing hydrocarbylene group in which the hetero atom is an oxygen atom. Examples of the hydrocarbylene groups include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group. Examples of the hetero atom-containing hydrocarbylene groups in which the hetero atom is a nitrogen atom include a group represented by —CH=N—CH=CH— and a group represented by —CH=N—CH$_2$—CH$_2$—. Examples of the hetero atom-containing hydrocarbylene groups in which the hetero atom is an oxygen atom include groups represented by —(CH$_2$)$_s$—O—(CH$_2$)$_t$— where s and t each represent an integer of 1 or more.

In the formula (III), each of the divalent group formed by joining $R^{31}$ and $R^{34}$, and the divalent group for $R^{33}$ may be a hydrocarbylene group, a hetero atom-containing hydrocarbylene group in which the hetero atom is a nitrogen atom, a hetero atom-containing hydrocarbylene group in which the hetero atom is an oxygen atom, a group in which a hydrocarbylene group and an oxygen atom are bonded, or a group in which a hydrocarbylene group and a group represented by —NR$^{35}$— (wherein R$^{35}$ represents a hydrocarbyl group or a hydrogen atom) are bonded. Examples of the hydrocarbylene groups include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group. Examples of the hetero atom-containing hydrocarbylene groups in which the hetero atom is a nitrogen atom include a group represented by —CH=N—CH=CH— and a group represented by —CH=N—CH$_2$CH$_2$—. Examples of the hetero atom-containing hydrocarbylene groups in which the hetero atom is an oxygen atom include groups represented by —(CH$_2$)$_s$—O—(CH$_2$)$_t$— where s and t each represent an integer of 1 or more. Examples of the groups in which a hydrocarbylene group and an oxygen atom are bonded include groups represented by —(CH$_2$)$_r$—O— where r represents an integer of 1 or more. Examples of the groups in which a hydrocarbylene group and a group represented by —NR$^{35}$— (wherein R$^{35}$ represents a hydrocarbyl group or a hydrogen atom) are bonded include groups represented by —(CH$_2$)$_p$—NR$^{35}$— where R$^{35}$ represents a hydrocarbyl group (preferably a $C_{1-6}$ hydrocarbyl group), or a hydrogen atom; and p represents an integer of 1 or more.

Preferred examples of the compound represented by the formula (III) include compounds represented by the formula (III) in which k is 0, and $R^{34}$ is an optionally substituted hydrocarbyl group or a hydrogen atom, represented by the following formula (IIIa):

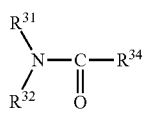
(IIIa)

wherein $R^{31}$ represents an optionally substituted hydrocarbyl group, or is joined to $R^{32}$ to form a hydrocarbylene group optionally containing a nitrogen atom and/or an oxygen atom as a hetero atom; $R^{32}$ represents an optionally substituted hydrocarbyl group, or is joined to $R^{31}$ to form a hydrocarbylene group optionally containing a nitrogen atom and/or an oxygen atom as a hetero atom; and $R^{34}$ represents an optionally substituted hydrocarbyl group or a hydrogen atom.

In the formula (IIIa), the description and examples of the optionally substituted hydrocarbyl group for $R^{31}$, $R^{32}$ or $R^{34}$, and the hydrocarbylene group optionally containing a nitrogen atom and/or an oxygen atom as a hetero atom, formed by joining $R^{31}$ and $R^{32}$, are the same as described for the formula (III).

In the formula (IIIa), preferably, $R^{31}$ is a $C_{1-10}$ hydrocarbyl group, or is joined to $R^{32}$ to form a $C_{3-10}$ hydrocarbylene group or a hetero atom-containing $C_{3-10}$ hydrocarbylene group in which the hetero atom is a nitrogen atom. More preferably, $R^{31}$ is a $C_{1-10}$ alkyl group or a $C_{6-10}$ aryl group, or is joined to $R^{32}$ to form a $C_{3-10}$ alkylene group, a group represented by —CH=N—CH=CH—, or a group represented by —CH=N—CH$_2$—CH$_2$—. $R^{31}$ is still more preferably a $C_{1-6}$ alkyl group, and particularly preferably a methyl group or an ethyl group.

In the formula (IIIa), preferably, $R^{32}$ is a $C_{1-10}$ hydrocarbyl group, or is joined to $R^{31}$ to form a $C_{3-10}$ hydrocarbylene group or a hetero atom-containing $C_{3-10}$ hydrocarbylene group in which the hetero atom is a nitrogen atom. More preferably, $R^{32}$ is a $C_{1-10}$ alkyl group or a $C_{6-10}$ aryl group, or is joined to $R^{31}$ to form a $C_{3-10}$ alkylene group, a group represented by —CH=N—CH=CH—, or a group represented by —CH=N—CH$_2$—CH$_2$—. $R^{32}$ is still more preferably a $C_{1-6}$ alkyl group, and particularly preferably a methyl group or an ethyl group.

In the formula (IIIa), $R^{34}$ is preferably a hydrocarbyl group or a hydrogen atom, more preferably a $C_{1-10}$ to hydrocarbyl group or a hydrogen atom, still more preferably a $C_{1-6}$ alkyl group or a hydrogen atom, and particularly preferably a hydrogen atom, a methyl group or an ethyl group.

Examples of the compounds represented by the formula (IIIa) in which $R^{34}$ is a hydrocarbyl group include N,N-dihydrocarbylacetamides such as N,N-dimethylacetamide, N,N-diethylacetamide, and N-methyl-N-ethylacetamide; N,N-dihydrocarbylacrylamides such as N-dimethylacrylamide, N,N-diethylacrylamide, and N-methyl-N-ethylacrylamide; and N,N-dihydrocarbylmethacrylamides such as N,N-dimethylmethacrylamide, N,N-diethylmethacrylamide, and N-methyl-N-ethylmethacrylamide.

Examples of the compounds represented by the formula (IIIa) in which $R^{34}$ is a hydrogen atom include N,N-dihydrocarbylformamides such as N,N-dimethylformamide, N,N-dimethylformamide, and N-methyl-N-ethylformamide.

Preferred examples of the compound represented by the formula (III) include compounds represented by the formula (III) in which k is 0, and $R^{34}$ is joined to $R^{31}$ to form a divalent group, represented by the following formula (IIIb):

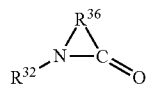

(IIIb)

wherein $R^{32}$ represents an optionally substituted hydrocarbyl group; and $R^{36}$ represents a hydrocarbylene group, or a group in which a hydrocarbylene group and a group represented by —NR$^{35}$— are bonded, where $R^{35}$ represents a hydrocarbyl group or a hydrogen atom.

In the formula (IIIb), the description and examples of the optionally substituted hydrocarbyl group for $R^{32}$ are the same as described for the formula (III).

In the formula (IIIb), examples of the hydrocarbylene groups for $R^{36}$ include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group. Examples of the groups in which a hydrocarbylene group and a group represented by —NR$^{35}$— (wherein $R^{35}$ represents a hydrocarbyl group or a hydrogen atom) are bonded for $R^{36}$ include groups represented by —(CH$_2$)$_p$—NR$^{35}$— where $R^{35}$ represents a hydrocarbyl group or a hydrogen atom, and p represents an integer of 1 or more.

In the formula (IIIb), $R^{32}$ is preferably a $C_{1-10}$ hydrocarbyl group, more preferably a $C_{1-10}$ alkyl group or a $C_{6-10}$ aryl group, still more preferably a $C_{1-5}$ alkyl group or a phenyl group, and particularly preferably a methyl group, an ethyl group, or a phenyl group.

In the formula (IIIb), $R^{36}$ is preferably a $C_{1-10}$ hydrocarbylene group, or a group in which a $C_{1-10}$ hydrocarbylene group and a group represented by —NR$^{35}$— (wherein $R^{35}$ represents a hydrocarbyl group (preferably a hydrocarbyl group) or a hydrogen atom) are bonded, more preferably a $C_{3-6}$ alkylene group or a group represented by —(CH$_2$)$_p$—NR$^{35}$— (wherein $R^{35}$ represents a hydrocarbyl group (preferably a $C_{1-10}$ hydrocarbyl group), and p represents an integer of 1 or more (preferably an integer of 2 to 5)), and further preferably a trimethylene group, a tetramethylene group, a pentamethylene group, or a group represented by —(CH$_2$)$_2$—N(CH$_3$)—.

Examples of the compounds represented by the formula (IIIb) in which $R^{36}$ is a hydrocarbylene group include N-hydrocarbyl-β-propiolactams such as N-methyl-β-propiolactam and N-phenyl-β-propiolactam; N-hydrocarbyl-2-pyrrolidones such as N-methyl-2-pyrrolidone, N-vinyl-2-pyrrolidone, N-phenyl-2-pyrrolidone, N-tert-butyl-2-pyrrolidone, and N-methyl-5-methyl-2-pyrrolidone; N-hydrocarbyl-2-piperidones such as N-methyl-2-piperidone, N-vinyl-2-piperidone, and N-phenyl-2-piperidone; N-hydrocarbyl-ε-caprolactams such as N-methyl-ε-caprolactam and N-phenyl-ε-caprolactam; and N-hydrocarbyl-ω-laurilolactams such as N-methyl-ω-laurilolactam and N-vinyl-ω-laurilolactam. Preferred among the above examples are N-phenyl-2-pyrrolidone and N-methyl-ε-caprolactam.

Examples of the compounds represented by the formula (IIIb) in which $R^{36}$ is a group in which a hydrocarbylene group and a group represented by —NR$^{35}$— (wherein $R^{35}$ represents a hydrocarbyl group or a hydrogen atom) are bonded include 1,3-dihydrocarbyl-2-imidazolidinones such as 1,3-dimethyl-2-imidazolidinone, 1,3-diethyl-2-imidazolidinone, 1,3-divinyl-2-imidazolidinone, and 1-methyl-3-ethyl-2-imidazolidinone. Preferred among the above examples is 1,3-dimethyl-2-imidazolidinone.

Preferred examples of the compound represented by the formula (III) include compounds represented by the formula (III) in which k is 1, and $R^{33}$ is a hydrocarbylene group, represented by the following formula (IIIc):

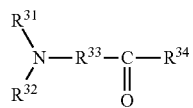

(IIIc)

wherein $R^{31}$ represents an optionally substituted hydrocarbyl group, or is joined to $R^{32}$ to form a hydrocarbylene group optionally containing a nitrogen atom and/or an oxygen atom as a hetero atom; $R^{32}$ represents an optionally substituted hydrocarbyl group, or is joined to $R^{31}$ to form a hydrocarbylene group optionally containing a nitrogen atom and/or an oxygen atom as a hetero atom; $R^{33}$ represents a hydrocarbylene group; and $R^{34}$ represents an optionally substituted hydrocarbyl group or a hydrogen atom.

In the formula (IIIc), the description and examples of the optionally substituted hydrocarbyl group for $R^{31}$, $R^{32}$ or $R^{34}$, the hydrocarbylene group optionally containing a nitrogen atom and/or an oxygen atom as a hetero atom, formed by joining $R^{31}$ and $R^{32}$, and the hydrocarbylene group for $R^{33}$ are the same as described for the formula (III).

In the formula (IIIc), $R^{33}$ is preferably a $C_{1-10}$ hydrocarbylene group, more preferably an a $C_{1-10}$ alkylene group or a $C_{6-10}$ arylene group, still more preferably a $C_{1-6}$ alkylene group or a phenylene group, and particularly preferably an ethylene group, a trimethylene group, or a 1,4-phenylene group.

In the formula (IIIc), $R^{34}$ is preferably a $C_{1-10}$ hydrocarbyl group, or a substituted $C_{1-10}$ hydrocarbyl group in which the substituent is a dialkylamino group, more preferably a $C_{1-6}$ alkyl group, a $C_{6-10}$ aryl group, a $C_{1-6}$ dialkylaminoalkyl group, or a $C_{6-10}$ dialkylaminoaryl group, and still more preferably a methyl group, an ethyl group, a phenyl group, a 3-dimethylaminoethyl group, or a 4-diethylaminophenyl group.

In the formula (IIIc), preferably, $R^{31}$ is a $C_{1-10}$ hydrocarbyl group, or is joined to $R^{32}$ to form a $C_{3-10}$ hydrocarbylene group, or a hetero atom-containing $C_{3-10}$ hydrocarbylene group in which the hetero atom is a nitrogen atom or an oxygen atom. More preferably, $R^{31}$ is a $C_{1-10}$ alkyl group or a $C_{6-10}$ aryl group, or is joined to $R^{32}$ to form a $C_{3-10}$ alkylene group, a group represented by —CH=N—CH=CH—, a group represented by —CH=N—CH$_2$—CH$_2$—, or a group represented by —(CH$_2$)$_2$—O—(CH$_2$)$_2$—. Still more preferably, $R^{31}$ is a $C_{1-6}$ alkyl group, or is joined to $R^{32}$ to form a $C_{3-6}$ alkylene group, a group represented by —CH=N—CH=CH—, or a group represented by —CH=N—CH$_2$—CH$_2$—. Particularly preferably, $R^{31}$ is a methyl group or an ethyl group, or is joined to $R^{32}$ to form a tetramethylene group, a hexamethylene group, or a group represented by —CH=N—CH=CH—.

In the formula (IIIc), preferably, $R^{32}$ is a $C_{1-10}$ hydrocarbyl group, or is joined to $R^{31}$ to form a $C_{3-10}$ hydrocarbylene group, or a hetero atom-containing $C_{3-10}$ hydrocarbylene group in which the hetero atom is a nitrogen atom or an oxygen atom. More preferably, $R^{32}$ is a $C_{1-10}$ alkyl group or a $C_{6-10}$ aryl group, or is joined to $R^{31}$ to form a $C_{3-10}$ alkylene group, a group represented by —CH=N—CH=CH—, a group represented by —CH=N—CH$_2$—CH$_2$—, or a group represented by —(CH$_2$)$_2$—O—(CH$_2$)$_2$—. Still more preferably, $R^{32}$ is a $C_{1-6}$ alkyl group, or is joined to $R^{31}$ to form a $C_{3-6}$ alkylene group, a group represented by —CH=N—CH=CH—, or a group represented by —CH=N—CH$_2$—CH$_2$—. Particularly preferably, $R^{32}$ is a methyl group or an ethyl group, or is joined to $R^{31}$ to form a tetramethylene group, a hexamethylene group, or a group represented by —CH=N—CH=CH—.

Examples of the compounds represented by the formula (IIIc) in which $R^{34}$ is a hydrocarbyl group include 4-N,N-dihydrocarbylaminoacetophenones such as 4-(N,N-dimethylamino) acetophenone, 4-N-methyl-N-ethylaminoacetophenone, and 4-N,N-diethylaminoacetophenone; and 4-cyclic aminoacetophenone compounds such as 4'-(imidazol-1-yl) acetophenone and 4-pyrazolylacetophenone. Preferred among the above examples are 4-cyclic aminoacetophenone compounds, more preferably 4'-(imidazol-1-yl)acetophenone.

Examples of the compounds represented by the formula (IIIc) in which $R^{34}$ is a substituted hydrocarbyl group include: bis(dihydrocarbylaminoalkyl)ketones such as 1,7-bis(methylethylamino)-4-heptanone and 1,3-bis(diphenylamino)-2-propanone; 4-(dihydrocarbylamino)benzophenones such as 4-N,N-dimethylaminobenzophenone, 4-N,N-di-t-butylaminobenzophenone, and 4-N,N-diphenylaminobenzophenone; and 4,4'-bis(dihydrocarbylamino)benzophenones such as 4,4'-bis(dimethylamino)benzophenone, 4,4'-bis(diethylamino)benzophenone, and 4,4'-bis(diphenylamino)benzophenone. Preferred among the above examples are 4,4'-bis(dihydrocarbylamino)benzophenones, more preferably 4,4'-bis(diethylamino)benzophenone.

Preferred examples of the compound represented by the formula (III) include compounds represented by the formula (III) in which k is 1, and $R^{33}$ is a group in which hydrocarbylene group and an oxygen atom are bonded, or a group in which a hydrocarbylene group and a group represented by —NR$^{35}$— (wherein $R^{35}$ represents a hydrocarbyl group or a hydrogen atom) are bonded, represented by the following formula (IIId):

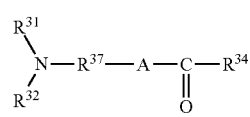

(IIId)

wherein $R^{31}$ represents an optionally substituted hydrocarbyl group, or is joined to $R^{32}$ to form a hydrocarbylene group optionally containing a nitrogen atom and/or an oxygen atom as a hetero atom; $R^{32}$ represents an optionally substituted hydrocarbyl group, or is joined to $R^{31}$ to form a hydrocarbylene group optionally containing a nitrogen atom and/or an oxygen atom as a hetero atom; $R^{37}$ represents a hydrocarbylene group; A represents an oxygen atom or —NR$^{35}$— wherein $R^{35}$ represents a hydrocarbyl group or a hydrogen atom; and $R^{34}$ represents an optionally substituted hydrocarbyl group or a hydrogen atom.

In the formula (IIId), the description and examples of the optionally substituted hydrocarbyl group for $R^{31}$, $R^{32}$ or $R^{34}$, and the hydrocarbylene group optionally containing a nitrogen atom and/or an oxygen atom as a hetero atom, formed by joining $R^{31}$ and $R^{32}$, are the same as described for the formula (III). Moreover, the hydrocarbyl group for $R^{35}$ is as described for the hydrocarbyl group for $R^{31}$, $R^{32}$, or $R^{34}$.

In the formula (IIId), A is preferably an oxygen atom or a group represented by —NR$^{35}$— (wherein $R^{35}$ represents a hydrocarbyl group (preferably a $C_{1-5}$ hydrocarbyl group) or a hydrogen atom), more preferably an oxygen atom or a group represented by —NH—, and still more preferably a group represented by —NH—.

In the formula (IIId), examples of the hydrocarbylene groups for $R^{37}$ include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group.

In the formula (IIId), $R^{34}$ is preferably a $C_{1-10}$ hydrocarbyl group, more preferably a $C_{2-5}$ alkenyl group, and still more preferably a vinyl group.

In the formula (IIId), $R^{37}$ is preferably a $C_{1-10}$ hydrocarbylene group, more preferably a $C_{1-6}$ alkylene group, still more preferably an ethylene group or a trimethylene group, and particularly preferably a trimethylene group.

In the formula (IIId), preferably, $R^{31}$ is a $C_{1-10}$ hydrocarbyl group, or is joined to $R^{32}$ to form a $C_{3-10}$ hydrocarbylene group, or a hetero atom-containing $C_{3-10}$ hydrocarbylene group in which the hetero atom is a nitrogen atom or an oxygen atom. More preferably, $R^{31}$ is a $C_{1-10}$ alkyl group or a $C_{6-10}$ aryl group, or is joined to $R^{32}$ to form a $C_{3-10}$ alkylene group, a group represented by —CH=N—CH=CH—, a group represented by —CH=N—CH$_2$—CH$_2$—, or a group represented by —(CH$_2$)$_2$—O—(CH$_2$)$_2$—. Still more preferably, $R^{31}$ is a $C_{1-6}$ alkyl group, or is joined to $R^{32}$ to form a $C_{3-6}$ alkylene group, a group represented by —CH=N—CH=CH—, or a group represented by —CH=N—CH$_2$—CH$_2$—. Particularly preferably, $R^{31}$ is a methyl group or an ethyl group, or is joined to $R^{32}$ to form a tetramethylene group, a hexamethylene group, or a group represented by —CH=N—CH=CH—.

In the formula (IIId), preferably, $R^{32}$ is a $C_{1-10}$ hydrocarbyl group, or is joined to $R^{31}$ to form a $C_{3-10}$ hydrocarbylene group, or a hetero atom-containing $C_{3-10}$ hydrocarbylene group in which the hetero atom is a nitrogen atom or an oxygen atom. More preferably, $R^{32}$ is a $C_{1-10}$ alkyl group or a $C_{6-10}$ aryl group, or is joined to $R^{31}$ to form a $C_{3-10}$ alkylene group, a group represented by —CH=N—CH=CH—, a group represented by —CH=N—CH$_2$—CH$_2$—, or a group represented by —(CH$_2$)$_2$—O—(CH$_2$)$_2$—. Still more preferably, $R^{32}$ is a $C_{1-6}$ alkyl group, or is joined to $R^{31}$ to form a $C_{3-6}$ alkylene group, a group represented by —CH=N—CH=CH—, or a group represented by —CH=N—CH$_2$—CH$_2$—. Particularly preferably, $R^{32}$ is a methyl group or an ethyl group, or is joined to $R^{31}$ to form a tetramethylene group, a hexamethylene group, or a group represented by —CH=N—CH=CH—.

Examples of the compounds represented by the formula (IIId) in which A is an oxygen atom include: 2-N,N-dihydrocarbylaminoethyl acrylates such as 2-N,N-dimethylaminoethyl acrylate and 2-N,N-diethylaminoethyl acrylate; 3-N,N-dihydrocarbylaminopropyl acrylates such as 3-N,N-dimethylaminopropyl acrylate; 2-N,N-dihydrocarbylaminoethyl methacrylates such as 2-N,N-dimethylaminoethyl methacrylate and 2-N,N-diethylaminoethyl methacrylate; and 3-N,N-dihydrocarbylaminopropyl methacrylates such as 3-N,N-dimethylaminopropyl methacrylate. Preferred are 3-N,N-dihydrocarbylaminopropyl acrylates, more preferably 3-N,N-dimethylaminopropyl acrylate.

Examples of the compounds represented by the formula (IIId) in which A is a group represented by —NR$^{35}$— (wherein $R^{35}$ represents a hydrocarbyl group or a hydrogen atom) include: N,N-dihydrocarbylaminoethyl acrylamides such as N,N-dimethylaminoethyl acrylamide and N,N-diethylaminoethyl acrylamide; N,N-dihydrocarbylaminopropyl acrylamides such as N,N-dimethylaminopropyl acrylamide and N,N-diethylaminopropyl acrylamide; N,N-dihydrocarbylaminobutyl acrylamides such as N,N-dimethylaminobutyl acrylamide and N,N-diethylaminobutyl acrylamide; N,N-dihydrocarbylaminoethyl methacrylamides such as N,N-dimethylaminoethyl methacrylamide and N,N-diethylaminoethyl methacrylamide; N,N-dihydrocarbylaminopropyl methacrylamides such as N,N-dimethylaminopropyl methacrylamide and N,N-diethylaminopropyl methacrylamide; and N,N-dihydrocarbylaminobutyl methacrylamides such as N,N-dimethylaminobutyl methacrylamide and N,N-diethylaminobutyl methacrylamide. Preferred are N,N-dihydrocarbylaminopropyl acrylamides, more preferably N,N-dimethylaminopropyl acrylamide.

The compound represented by the formula (III) is preferably a compound represented by the formula (IIId), particularly preferably an N,N-dihydrocarbylaminopropyl acrylamide, and most preferably N,N-dimethylaminopropyl acrylamide.

In addition to those described above, preferred examples of the compound containing a nitrogen atom and/or a silicon atom include alkoxysilyl group-containing compounds.

The alkoxysilyl group-containing compound is preferably a compound containing a nitrogen atom and an alkoxysilyl group, and more preferably a compound represented by the following formula (IV):

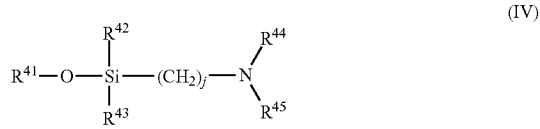

wherein $R^{41}$ represents a hydrocarbyl group; $R^{42}$ and $R^{43}$ each represent a hydrocarbyl group or a hydrocarbyloxy group; $R^{44}$ represents an optionally substituted hydrocarbyl group or a trihydrocarbylsilyl group, or is joined to $R^{45}$ to form a hydrocarbylene group optionally containing at least one, as a hetero atom, selected from the group consisting of a silicon atom, a nitrogen atom and an oxygen atom; $R^{45}$ represents an optionally substituted hydrocarbyl group or a trihydrocarbylsilyl group, or is joined to $R^{44}$ to form a hydrocarbylene group optionally containing at least one, as a hetero atom, selected from the group consisting of a silicon atom, a nitrogen atom and an oxygen atom; and j represents an integer of 1 to 5.

In the formula (IV), the optionally substituted hydrocarbyl group refers to a hydrocarbyl group or a substituted hydrocarbyl group. Examples of the hydrocarbyl groups include alkyl groups such as a methyl group, an ethyl group, an n-propyl group, an isopropyl group, and an n-butyl group; alkenyl groups such as a vinyl group, an allyl group, and an isopropenyl group; and aryl groups such as a phenyl group, preferably alkyl groups, and more preferably a methyl group or an ethyl group. Examples of the substituted hydrocarbyl groups include oxacycloalkyl groups such as an oxiranyl group and a tetrahydrofuranyl group, preferably a tetrahydrofuranyl group.

Herein, an oxacycloalkyl group refers to a group in which a CH$_2$ on an alicycle of a cycloalkyl group is replaced with an oxygen atom.

Examples of the hydrocarbyloxy groups include alkoxy groups such as a methoxy group, an ethoxy group, an n-propoxy group, an isopropoxy group, an n-butoxy group, a sec-butoxy group, and a tert-butoxy group; and aryloxy groups such as a phenoxy group and a benzyloxy group, preferably alkoxy groups, and more preferably a methoxy group or an ethoxy group.

Examples of the trihydrocarbylsilyl groups include a trimethylsilyl group and a tert-butyl-dimethylsilyl group, preferably a trimethylsilyl group.

The hydrocarbylene group optionally containing at least one, as a hetero atom, selected from the group consisting of a silicon atom, a nitrogen atom and an oxygen atom refers to a hydrocarbylene group, or a hetero atom-containing hydrocarbylene group in which the hetero atom is at least one selected from the group consisting of a silicon atom, a nitrogen atom and an oxygen atom. The hetero atom-containing hydrocarbylene group in which the hetero atom is at least one selected from the group consisting of a silicon atom, a nitrogen atom and an oxygen atom may be a hetero atom-containing hydrocarbylene group in which the hetero atom is a silicon atom, a hetero atom-containing hydrocarbylene group in which the hetero atom is a nitrogen atom, or a hetero atom-containing hydrocarbylene group in which the hetero atom is an oxygen atom. Examples of the hydrocarbylene groups include alkylene groups such as a tetramethylene group, a pentamethylene group, a hexamethylene group, a pentan-2-en-1,5-diyl group, and a 2,2,4-trimethylhexane-1,6-diyl group. Preferred among them are $C_{4-7}$ alkylene groups, particularly preferably a pentamethylene group or a hexamethylene group. Examples of the hetero atom-containing hydrocarbylene groups in which the hetero atom is a silicon atom include a group represented by —Si(CH$_3$)$_2$—CH$_2$—CH$_2$—Si(CH$_3$)$_2$—. Examples of the hetero atom-containing hydrocarbylene groups in which the hetero atom is a nitrogen atom include a group represented by —CH=N—CH=CH—, and a group represented by —CH=N—CH$_2$—CH$_2$—. Examples of the hetero atom-containing hydrocarbylene groups in which the hetero atom is an oxygen atom include a group represented by —CH$_2$—CH$_2$—O—CH$_2$—CH$_2$—.

In the formula (IV), $R^{41}$ is preferably a alkyl group, and more preferably a methyl group or an ethyl group. Each of $R^{42}$ and $R^{43}$ is preferably a hydrocarbyloxy group, more preferably a alkoxy group, and still more preferably a methoxy group or an ethoxy group. Each of $R^{44}$ and $R^{45}$ is preferably a hydrocarbyl group, more preferably a $C_{1-4}$ alkyl group, and still more preferably a methyl group or an ethyl group. Moreover, j is preferably an integer of 2 to 4.

Examples of the compounds represented by the formula (IV) include: [(dialkylamino)alkyl]alkoxysilane compounds such as 3-dimethylaminopropyltriethoxysilane, 3-dimethylaminopropyltrimethoxysilane, 3-diethylaminopropyltriethoxysilane, 3-diethylaminopropyltrimethoxysilane, 3-dimethylaminopropylmethyldiethoxysilane, 2-dimethylaminoethyltriethoxysilane, and 2-dimethylaminoethyltrimethoxysilane; cyclic aminoalkylalkoxysilane compounds such as hexamethyleneiminomethyltrimethoxysilane, 3-hexamethyleneiminopropyltriethoxysilane, N-(3-triethoxysilylpropyl)-4,5-dihydroimidazole, and N-(3-trimethoxysilylpropyl)-4,5-imidazole; [di(tetrahydrofuranyl)amino]alkylalkoxysilane compounds such as 3-[di(tetrahydrofuranyl)amino]propyltrimethoxysilane and 3-[di(tetrahydrofuranyl)amino]propyltriethoxysilane; and N,N-bis(trialkylsilyl)aminoalkylalkoxysilane compounds such as N,N-bis(trimethylsilyl)aminopropylmethyldimethoxysilane and N,N-bis(trimethylsilyl)aminopropylmethyldiethoxysilane. Preferred among the above examples are [(dialkylamino)alkyl]alkoxysilane compounds, more preferably 3-dimethylaminopropyltriethoxysilane, 3-dimethylaminopropyltrimethoxysilane, 3-diethylaminopropyltriethoxysilane, and 3-diethylaminopropyltrimethoxysilane.

Examples of the alkoxysilyl group-containing compounds include, in addition to the aforementioned compounds containing a nitrogen atom and an alkoxysilyl group, tetraalkoxysilanes such as tetramethoxysilane, tetraethoxysilane, and tetra-n-propoxysilane; trialkoxyhydrocarbylsilanes such as methyltrimethoxysilane, methyltriethoxysilane, ethyltrimethoxysilane, and phenyltrimethoxysilane; trialkoxyhalosilanes such as trimethoxychlorosilane, triethoxychlorosilane, and tri-n-propoxychlorosilane; dialkoxydihydrocarbylsilanes such as dimethoxydimethylsilane, diethoxydimethylsilane, and dimethoxydiethylsilane; dialkoxydihalosilanes such as dimethoxydichlorosilane, diethoxydichlorosilane, and di-n-propoxydichlorosilane; monoalkoxytrihydrocarbylsilanes such as methoxytrimethylsilane; monoalkoxytrihalosilanes such as methoxytrichlorosilane and ethoxytrichlorosilane; (glycidoxyalkyl)alkoxysilane compounds such as 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, and (3-glycidoxypropyl)methyldimethoxysilane; (3,4-epoxycyclohexyl)alkylalkoxysilane compounds such as 2-(3,4-epoxycyclohexyl)ethyltrimethoxysilane, 2-(3,4-epoxycyclohexyl)ethyltriethoxysilane, and 2-(3,4-epoxycyclohexyl)ethyl(methyl)dimethoxysilane; alkoxysilylalkylsuccinic anhydrides such as 3-trimethoxysilylpropylsuccinic anhydride and 3-triethoxysilylpropylsuccinic anhydride; and (methacryloyloxyalkyl)alkoxysilane compounds such as 3-methacryloyloxypropyltrimethoxysilane and 3-methacryloyloxypropyltriethoxysilane.

The alkoxysilyl group-containing compound may contain a nitrogen atom and a carbonyl group. Examples of the compound containing a nitrogen atom and a carbonyl group as well as an alkoxysilyl group include tris[(alkoxysilyl)alkyl]isocyanurate compounds such as tris[3-(trimethoxysilyl)propyl]isocyanurate, tris[3-(triethoxysilyl)propyl]isocyanurate, tris[3-(tripropoxysilyl)propyl]isocyanurate, and tris[3-(tributoxysilyl)propyl]isocyanurate. Preferred among them is tris[3-(trimethoxysilyl)propyl]isocyanurate.

Other examples of the compounds containing a nitrogen atom and/or a silicon atom include N,N-dialkyl-substituted carboxylic acid amide dialkyl acetal compounds. Examples of the N,N-dialkyl-substituted carboxylic acid amide dialkyl acetal compounds include N,N-dialkylformamide dialkyl acetals such as N,N-dimethylformamide dimethyl acetal and N,N-diethylformamide dimethyl acetal; N,N-dialkylacetamide dialkyl acetals such as N,N-dimethylacetamide dimethyl acetal and N,N-diethylacetamide dimethyl acetal; and N,N-dialkylpropionamide dialkyl acetals such as N,N-dimethylpropionamide dimethyl acetal and N,N-diethylpropionamide dimethyl acetal. Preferred among them are N,N-dialkylformamide dialkyl acetals, more preferably N,N-dimethylformamide dimethyl acetal.

In the method of producing the conjugated diene polymer, a coupling agent may be added to a solution of the conjugated diene polymer in a hydrocarbon at any time from the initiation of the polymerization of monomers before the recovery of the polymer described later. Examples of the coupling agents include compounds represented by the following formula (V):

$$R^{51}{}_{a}ML_{4-a} \qquad (V)$$

wherein $R^{51}$ represents an alkyl group, an alkenyl group, a cycloalkenyl group, or an aryl group; M represents a silicon atom or a tin atom; L represents a halogen atom or a hydrocarbyloxy group; and a represents an integer of 0 to 2.

Examples of the coupling agents represented by the formula (V) include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

In terms of enhancing the processability of the conjugated diene polymer, the amount of the coupling agent to be added per mol of the alkali metal derived from an alkali metal catalyst is preferably not less than 0.03 mol and more preferably not less than 0.05 mol. In terms of enhancing fuel economy, the amount is preferably not more than 0.4 mol and more preferably not more than 0.3 mol.

In the method of producing the conjugated diene polymer, unreacted active terminals may be treated with alcohol, such as methanol or isopropyl alcohol, before the recovery of the polymer described later.

The conjugated diene polymer may be recovered from the solution of the conjugated diene polymer in a hydrocarbon by a known method. Examples of this method include (A) a method of adding a coagulant to the solution of the conjugated diene polymer in a hydrocarbon, and (B) a method of adding steam to the solution of the conjugated diene polymer in a hydrocarbon (steam stripping treatment). The recovered conjugated diene polymer may be dried with a known dryer, such as a band dryer or an extrusion dryer.

In terms of achieving a balanced enhancement in fuel economy, tensile strength at break, and processability, the amount of the structural unit derived from the polymerization initiator represented by the formula (I) in the conjugated diene polymer, when expressed per unit mass of the polymer, is preferably not less than 0.0001 mmol/g polymer, and more preferably not less than 0.001 mmol/g polymer, whereas it is preferably not more than 0.15 mmol/g polymer, and more preferably not more than 0.1 mmol/g polymer.

In terms of achieving a balanced enhancement in fuel economy, tensile strength at break, and processability, the amount of the structural unit derived from the silicon-containing vinyl compound in the conjugated diene polymer, when expressed per unit mass of the polymer, is preferably not less than 0.01 mmol/g polymer, and more preferably not less than 0.02 mmol/g polymer, whereas it is preferably not more than 0.4 mmol/g polymer, and more preferably not more than 0.2 mmol/g polymer.

In terms of achieving a balanced enhancement in fuel economy, tensile strength at break, and processability, the conjugated diene polymer preferably contains a structural unit derived from the compound represented by the formula (II). The structural unit derived from the compound represented by the formula (II) in the conjugated diene polymer refers to a structural unit represented by the following formula (IIb):

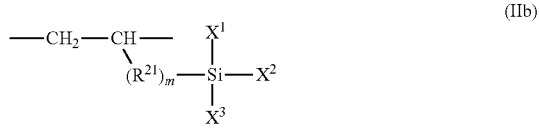

(IIb)

wherein m, $R^{21}$, $X^1$, $X^2$, and $X^3$ are as defined in the formula (II).

In the conjugated diene polymer in the present invention, at least one of $X^1$, $X^2$ and $X^3$ in the structural unit derived from the compound represented by the formula (II) is preferably replaced by a hydroxy group, more preferably two or more of $X^1$, $X^2$ and $X^3$ are replaced by hydroxy groups, and still more preferably two of $X^1$, $X^2$ and $X^3$ are replaced by hydroxy groups. This can enhance the effects of improving fuel economy, tensile strength at break, and processability. Non-limiting examples of the method of replacing at least one of $X^1$, $X^2$, and $X^3$ with a hydroxy group include steam stripping treatment.

In terms of achieving a balanced enhancement in fuel economy, tensile strength at break, and processability, the conjugated diene polymer preferably contains a structural unit derived from an aromatic vinyl compound (aromatic vinyl unit). When the conjugated diene polymer contains an aromatic vinyl unit, the amount of the aromatic vinyl unit in the conjugated diene polymer, based on 100% by mass of the combined amount of the structural unit derived from the conjugated diene compound (conjugated diene unit) and the aromatic vinyl unit, is preferably not less than 10% by mass (the amount of the conjugated diene unit is not more than 90% by mass), and more preferably not less than 15% by mass (the amount of the conjugated diene unit is not more than 85% by mass). Also, from the viewpoint of fuel economy, the amount of the aromatic vinyl unit is preferably not more than 50% by mass (the amount of the conjugated diene unit is not less than 50% by mass), and more preferably not more than 45% by mass (the amount of the conjugated diene unit is not less than 55% by mass).

When the conjugated diene polymer contains a structural unit derived from an aromatic vinyl compound, in terms of fuel economy, the vinyl bond content (vinyl content) in the conjugated diene polymer is preferably not more than 80 mol %, and more preferably not more than 70 mol %, based on 100 mol % of the conjugated diene unit content.

Particularly in terms of enhancing tensile strength at break, the conjugated diene polymer preferably contains no structural unit derived from an aromatic vinyl compound. In this case, the vinyl bond content (vinyl content) in the conjugated diene polymer is preferably not more than 20 mol %, and more preferably not more than 15 mol %, based on 100 mol % of the conjugated diene unit content.

The vinyl bond content in the conjugated diene polymer can be measured by the method described later in examples.

In terms of enhancing fuel economy, the molecular weight distribution of the conjugated diene polymer is preferably 1 to 5, and more preferably 1 to 2. The molecular weight distribution can be determined by measuring a number-average molecular weight (Mn) and a weight-average molecular weight (Mw) using gel permeation chromatography (GPC), and dividing Mw by Mn.

The conjugated diene polymer can be used as the rubber component in the rubber composition of the present invention.

The amount of the conjugated diene polymer based on 100% by mass of the rubber component is not less than 10% by mass, preferably not less than 30% by mass, more preferably not less than 50% by mass, and still more preferably not less than 70% by mass. An amount less than 10% by mass tends not to easily achieve the effect of improving fuel economy. The amount of the conjugated diene polymer is preferably not more than 90% by mass, and more preferably not more than 85% by mass. An amount more than 90% by mass tends to result in reduced tensile strength at break as well as high cost.

The rubber component preferably includes the conjugated diene polymer in combination with other rubber materials. The other rubber material may suitably be a polyisoprene-based rubber. When a polyisoprene-based rubber is added, tensile strength at break is enhanced, and the cohesion of the rubber compound during mixing is improved so that productivity can be improved.

Examples of the polyisoprene-based rubbers include natural rubber (NR), and polyisoprene rubber (IR). The NR is not particularly limited, and examples thereof include those generally used in the tire industry, such as SIR20, RSS#3, TSR20, deproteinized natural rubber (DPNR), highly purified natural rubber (HPNR), and epoxidized natural rubber (ENR). Similarly, IRs generally used in the tire industry may be used.

In the case where the rubber composition of the present invention includes a polyisoprene-based rubber, the amount of the polyisoprene-based rubber based on 100% by mass of the rubber component is preferably not less than 5% by mass, and more preferably not less than 15% by mass. If the amount is less than 5% by mass, the effect of improving tensile strength at break may not be sufficiently achieved. The amount of the polyisoprene-based rubber is preferably not more than 50% by mass, and more preferably not more than 30% by mass. If the amount of the polyisoprene-based rubber exceeds 50% by mass, processability tends to deteriorate.

Examples of applicable rubber materials other than polyisoprene-based rubbers include conventional rubbers such as styrene-butadiene copolymer rubber (SBR), polybutadiene rubber (BR), butadiene-isoprene copolymer rubber, and butyl rubber. Ethylene-propylene copolymers, ethylene-octene copolymers and the like may also be mentioned. Two or more kinds of the rubber materials may be used in combination. Suitable among these are those having at least 50% by mass of a structural unit derived from a conjugated diene compound, from the viewpoint of achieving a balanced improvement in fuel economy, rubber strength, adhesion, and processability. Specifically, BR or SBR is preferred.

The BR is not particularly limited, and examples thereof include those generally used in the tire industry, including BRs with high cis content, such as BR1220 (produced by ZEON Corporation), and BR130B and BR150B (produced by Ube Industries, Ltd.); and syndiotactic polybutadiene crystal-containing BRs such as VCR412 and VCR617 (produced by Ube Industries, Ltd.).

Similarly, the SBR is not particularly limited, and examples thereof include those generally used in the tire industry, such as Nipol NS116R (produced by ZEON Corporation).

The rubber composition of the present invention includes silica. Examples of the silica include, but not limited to, dry silica (anhydrous silica) and wet silica (hydrous silica). Wet silica is preferred because it has more silanol groups.

The silica preferably has a nitrogen adsorption specific surface area ($N_2SA$) of not less than 40 m$^2$/g, more preferably not less than 50 m$^2$/g. If the silica has a $N_2SA$ less than 40 m$^2$/g, the silica tends to have a little reinforcement, and thus tensile strength at break tends to decrease. The silica preferably has a $N_2SA$ of not more than 400 m$^2$/g, more preferably not more than 360 m$^2$/g, and still more preferably not more than 300 m$^2$/g. A silica having a $N_2SA$ more than 400 m$^2$/g tends not to disperse easily, and thus fuel economy and processability tend to deteriorate.

The $N_2SA$ of silica is determined by the BET method in accordance with ASTM D3037-93.

The amount of silica (the combined amount if two or more kinds of silica are used) for each 100 parts by mass of the rubber component is not less than 10 parts by mass, preferably not less than 15 parts by mass. If the amount is less than 10 parts by mass, the effect of silica added tends not to be sufficiently achieved, and thus tensile strength at break tends to decrease. The amount of silica is not more than 70 parts by mass, preferably not more than 65 parts by mass. If the amount exceeds 70 parts by mass, processability tends to deteriorate.

Two or more kinds of silica are preferably used in combination although one kind of silica may be used alone. A combination of silica (1) having a nitrogen adsorption specific surface area of at least 40 m$^2$/g but less than 120 m$^2$/g, and silica (2) having a nitrogen adsorption specific surface area of not less than 120 m$^2$/g is more preferred. When the silica (1) and the silica (2) are used together with the conjugated diene polymer, the silica (1) and the silica (2) disperse so well that the effects of improving the properties can be synergistically enhanced; in particular, fuel economy and tensile strength at break can be greatly improved. Further, when the silica (1) and the silica (2) are used together with a mercapto group-containing silane coupling agent or a specific liquid resin, which are described later, the effects of improving the properties can further be enhanced.

The silica (1) is not particularly limited. For example, ULTRASIL 360 (produced by Evonik Degussa), Z40 (produced by Rhodia), RP80 (produced by Rhodia), and other products are available as the silica (1). Similarly, the silica (2) is not particularly limited. For example, ZEOSIL 1205 MP (produced by Rhodia) and other products are available as the silica (2). These may be used alone, or two or more of these may be used in combination.

The $N_2SA$s of silica (1) and silica (2) preferably satisfy the inequality: ($N_2SA$ of silica (2))/($N_2SA$ of silica (1))≥1.4, more preferably the inequality: ($N_2SA$ of silica (2))/($N_2SA$ of silica (1))≥2.0. If the ratio is less than 1.4, the difference in particle size between the silica (1) and the silica (2) is small, and thus such a blend of two kinds of silica tends not to sufficiently provide a dispersibility-improving effect.

The silica (1) has a $N_2SA$ of not less than 40 m$^2$/g, preferably not less than 50 m$^2$/g. If the silica (1) has a $N_2SA$ less than 40 m$^2$/g, the silica may have an insufficient reinforcement, and thus tensile strength at break may decrease. Also, the silica (1) has a $N_2SA$ of less than 120 m$^2$/g, preferably not more than 100 m$^2$/g, and more preferably not more than 80 m$^2$/g. If the silica (1) has a $N_2SA$ of not less than 120 m$^2$/g, the effect of a combination of the silica (1) and the silica (2) may not be sufficiently achieved.

The silica (2) has a $N_2SA$ of not less than 120 m$^2$/g, preferably not less than 150 m$^2$/g. If the silica (2) has a $N_2SA$ less than 120 m$^2$/g, the effect of a combination of the silica (1) and the silica (2) may not be sufficiently achieved. The silica (2) preferably has a $N_2SA$ of not more than 250 m$^2$/g, more preferably not more than 220 m$^2$/g. If the silica (2) has a $N_2SA$ more than 250 m$^2$/g, fuel economy and processability tend to deteriorate.

The amounts of silica (1) and silica (2) preferably satisfy the following inequalities:

$$(\text{Amount of silica}(1)) \times 0.06 \leq (\text{Amount of silica}(2)) \leq (\text{Amount of silica}(1)) \times 15.$$

If the amount of silica (2) is less than 0.06 times the amount of silica (1), a sufficient rubber strength tends not to be achieved. If the amount of silica (2) is more than 15 times the amount of silica (1), rolling resistance tends to increase. The amount of silica (2) is more preferably at least 0.3 times the amount of silica (1), and still more preferably at least 0.5 times the amount of silica (1). Also, the amount of silica (2) is more preferably at most 7 times the amount of silica (1), and still more preferably at most 4 times the amount of silica (1).

The amount of silica (1) for each 100 parts by mass of the rubber component is preferably not less than 5 parts by mass, and more preferably not less than 10 parts by mass. If the amount of silica (1) is less than 5 parts by mass, fuel economy may not be sufficiently improved. Also, the amount of silica (1) is preferably not more than 70 parts by mass, and more preferably not more than 65 parts by mass. If the amount of silica (1) is more than 70 parts by mass, while good fuel economy is achieved, tensile strength at break tends to decrease.

The amount of silica (2) for each 100 parts by mass of the rubber component is preferably not less than 5 parts by mass, and more preferably not less than 10 parts by mass. If the amount of silica (2) is less than 5 parts by mass, sufficient tensile strength at break may not be achieved. Also, the amount of silica (2) is preferably not more than 70 parts by mass, and more preferably not more than 65 parts by mass. If the amount of silica (2) is more than 70 parts by mass, while good tensile strength at break is achieved, processability tends to deteriorate.

The combined amount of silica (1) and silica (2) for each 100 parts by mass of the rubber component is preferably not less than 10 parts by mass, more preferably not less than 15 parts by mass, and still more preferably not less than 20 parts by mass. If the combined amount is less than 10 parts by mass, a blend of silica (1) and silica (2) may not provide a sufficient reinforcement. Also, the combined amount of silica (1) and silica (2) is preferably not more than 70 parts by mass, and more preferably not more than 65 parts by mass. If the combined amount exceeds 70 parts by mass, silica may not easily disperse uniformly in the rubber composition, thus causing not only deterioration of the processability of the rubber composition but also an increase in rolling resistance.

The rubber composition of the present invention preferably includes a mercapto group-containing silane coupling agent. The use of a mercapto group-containing silane coupling agent together with the conjugated diene polymer enables silica to disperse so well that the properties can be synergistically improved. Further, when a mercapto group-containing silane coupling agent is used together with the silica (1) and the silica (2) or a specific liquid resin mentioned later, the effects of improving the properties can be further enhanced.

The mercapto group-containing silane coupling agent may suitably be a compound represented by the formula (1) below, and/or a compound containing a linking unit A represented by the formula (2) below and a linking unit B represented by the formula (3) below,

(1)

wherein $R^{101}$ to $R^{103}$ each represent a branched or unbranched $C_{1-12}$ alkyl group, a branched or unbranched $O_{1-12}$ alkoxy group, or a group represented by —O—($R^{111}$—O—)$_z$—$R^{112}$ where z $R^{111}$s each represent a branched or unbranched $C_{1-30}$ divalent hydrocarbon group, and z $R^{111}$s may be the same as or different from one another; $R^{112}$ represents a branched or unbranched $C_{1-30}$ alkyl group, a branched or unbranched $C_{2-30}$ alkenyl group, a $C_{6-30}$ aryl group, or a $C_{7-30}$ aralkyl group; and z represents an integer of 1 to 30, and $R^{101}$ to $R^{103}$ may be the same as or different from one another; and $R^{104}$ represents a branched or unbranched $C_{1-6}$ alkylene group;

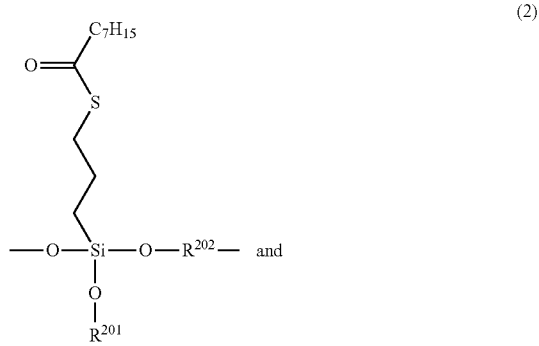

(2)

and

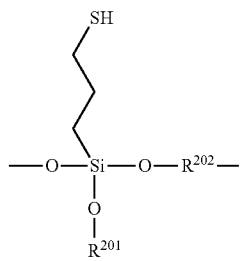

(3)

wherein $R^{201}$ represents a hydrogen atom, a halogen atom, a branched or unbranched $C_{1-30}$ alkyl group, a branched or unbranched $C_{2-30}$ alkenyl group, a branched or unbranched $C_{2-30}$ alkynyl group, or the alkyl group in which a terminal hydrogen atom is replaced with a hydroxy group or a carboxyl group; $R^{202}$ represents a branched or unbranched $C_{1-30}$ alkylene group, a branched or unbranched $C_{2-30}$ alkenylene group, or a branched or unbranched $C_{2-30}$ alkynylene group; and $R^{2131}$ and $R^{202}$ may be joined together to form a cyclic structure.

The following describes the compound represented by the formula (I).

The use of the compound represented by the formula (1) enables silica to disperse well, and thus the effects of the present invention can be well achieved. In particular, the use of this compound can more greatly improve fuel economy.

$R^{101}$ to $R^{103}$ each represent a branched or unbranched $C_{1-12}$ alkyl group, a branched or unbranched $C_{1-12}$ alkoxy group, or a group represented by —O—($R^{111}$—O)$_z$—$R^{112}$. In terms of achieving the effects of the present invention well, preferably at least one of $R^{101}$ to $R^{103}$ is a group represented by —O—($R^{111}$—O)$_z$—$R^{112}$, and more preferably two of $R^{101}$ to $8^{103}$ are groups represented by —O—($R^{111}$—O)$_z$—$R^{112}$ while the other is a branched of unbranched $C_{1-12}$ alkoxy group.

Examples of the branched or unbranched $C_{1-12}$ (preferably $C_{1-5}$) alkyl groups for $R^{101}$ to $R^{103}$ include a methyl group, an ethyl group, an n-propyl group, an isopropyl group, an n-butyl group, an iso-butyl group, a sec-butyl group, a tert-butyl group, a pentyl group, a hexyl group, a heptyl group, a 2-ethylhexyl group, an octyl group, and a nonyl group.

Examples of the branched or unbranched $C_{1-12}$ (preferably $C_{1-5}$) alkoxy groups for $R^{101}$ to $R^{103}$ include a methoxy group, an ethoxy group, an n-propoxy group, an isopropoxy group, an n-butoxy group, an iso-butoxy group, a sec-butoxy group, a tert-butoxy group, a pentyloxy group, a hexyloxy group, a heptyloxy group, a 2-ethylhexyloxy group, an octyloxy group, and a nonyloxy group.

$R^{111}$ in the group represented by —O—($R^{111}$—O)$_z$—$R^{112}$ for $R^{101}$ to $R^{103}$ represents a branched or unbranched $C_{1-30}$ (preferably $C_{1-15}$, more preferably $C_{1-3}$) divalent hydrocarbon group.

Examples of the hydrocarbon groups include branched or unbranched $C_{1-30}$ alkylene groups, branched or unbranched $C_{2-30}$ alkenylene groups, branched or unbranched $C_{2-30}$ alkynylene groups, and branched or unbranched $C_{6-30}$ arylene groups. Branched or unbranched $C_{1-30}$ alkylene groups are preferred among the examples.

Examples of the branched or unbranched $C_{1-30}$ (preferably $C_{1-15}$, more preferably $C_{1-3}$) alkylene groups for $R^{111}$ include a methylene group, an ethylene group, a propylene group, a butylene group, a pentylene group, a hexylene group, a heptylene group, an octylene group, a nonylene group, a decylene group, an undecylene group, a dodecylene group, a tridecylene group, a tetradecylene group, a pentadecylene group, a hexadecylene group, a heptadecylene group, and an octadecylene group.

Examples of the branched or unbranched $C_{2-30}$ (preferably $C_{2-15}$, more preferably $C_{2-3}$) alkenylene groups for $R^{111}$ include a vinylene group, a 1-propenylene group, a 2-propenylene group, a 1-butenylene group, a 2-butenylene group, a 1-pentenylene group, a 2-pentenylene group, a 1-hexenylene group, a 2-hexenylene group, and a 1-octenylene group.

Examples of the branched or unbranched $C_{2-30}$ (preferably $C_{2-15}$, more preferably $C_{2-3}$) alkynylene groups for $R^{111}$ include an ethynylene group, a propynylene group, a butynylene group, a pentynylene group, a hexynylene group, a heptynylene group, an octynylene group, a nonynylene group, a decynylene group, an undecynylene group, and a dodecynylene group.

Examples of the $C_{6-30}$ (preferably $C_{6-15}$) arylene groups for $R^{111}$ include a phenylene group, a tolylene group, a xylylene group, and a naphthylene group.

Here, z represents an integer of 1 to 30 (preferably 2 to 20, more preferably 3 to 7, and still more preferably 5 or 6).

$R^{112}$ represents a branched or unbranched $C_{1-30}$ alkyl group, a branched or unbranched $C_{2-30}$ alkenyl group, a $C_{6-30}$ aryl group, or a $C_{7-30}$ aralkyl group. $R^{112}$ is especially preferably a branched or unbranched $C_{1-30}$ alkyl group.

Examples of the branched or unbranched $C_{1-30}$ (preferably $C_{3-25}$, more preferably $C_{10-15}$) alkyl groups for $R^{112}$ include a methyl group, an ethyl group, an n-propyl group, an isopropyl group, an n-butyl group, an iso-butyl group, a sec-butyl group, a tert-butyl group, a pentyl group, a hexyl group, a heptyl group, a 2-ethylhexyl group, an octyl group, a nonyl group, a decyl group, an undecyl group, a dodecyl group, a tridecyl group, a tetradecyl group, a pentadecyl group, and an octadecyl group.

Examples of the branched or unbranched $C_{2-30}$ (preferably $C_{3-25}$, more preferably $C_{10-15}$) alkenyl groups for $R^{112}$ include a vinyl group, a 1-propenyl group, a 2-propenyl group, a 1-butenyl group, a 2-butenyl group, a 1-pentenyl group, a 2-pentenyl group, a 1-hexenyl group, a 2-hexenyl group, a 1-octenyl group, a decenyl group, an undecenyl group, a dodecenyl group, a tridecenyl group, a tetradecenyl group, a pentadecenyl group, and an octadecenyl group.

Examples of the $C_{6-30}$ (preferably $C_{10-20}$) aryl groups for $R^{112}$ include a phenyl group, a tolyl group, a xylyl group, a naphthyl group, and a biphenyl group.

Examples of the $C_{7-30}$ (preferably $C_{10-20}$) aralkyl groups for $R^{112}$ include a benzyl group and a phenethyl group.

Specific examples of the group represented by —O—$(R^{111}$—O$)_z$—$R^{112}$ include groups represented by —O—$(C_2H_4$—O$)_5$—$C_{11}H_{23}$, —O—$(C_2H_4$—O$)_5$—$C_{12}H_{25}$, —O—$(C_2H_4$—O$)_5$—$C_{13}H_{27}$, —O—$(C_2H_4$—O) $C_{14}H_{29}$, —O—$(C_2H_4$—O$)_5$—$C_{15}H_{31}$, —O—$(C_2H_4$—O$)_3$—$C_{13}H_{27}$, —O—$(C_2H_4$—O$)_4$—$C_{13}H_{27}$, —O—$(C_2H_4$—O$)_6$—$C_{13}H_{27}$ and —O— $(C_2H_4$—O$)_7$—$C_{13}H_{27}$. Preferred among the examples are groups represented by —O—$(C_2H_4$—O$)_5$—$C_{11}H_{23}$, —O—$(C_2H_4$—O$)_5$—$C_{13}H_{27}$, —O—$(C_2H_4$—O$)_5$—$C_{15}H_{31}$, and —O—$(C_2H_4$—O$)_6$—$O_{13}H_{27}$.

Examples of the branched or unbranched $C_{1-6}$ (preferably $C_{1-5}$) alkylene groups for $R^{104}$ include groups as mentioned for the branched or unbranched $C_{1-30}$ alkylene group for $R^{111}$.

Examples of the compounds represented by the formula (1) include 3-mercaptopropyltrimethoxysilane, 3-mercaptopropyltriethoxysilane, 2-mercaptoethyltrimethoxysilane, 2-mercaptoethyltriethoxysilane, and a compound represented by the following formula (Si363 produced by Evonik Degussa). The compound represented by the following formula may be suitably used. These compounds may be used alone, or two or more of these may be used in combination.

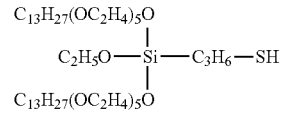

The following describes the compound containing a linking unit A represented by the formula (2) and a linking unit B represented by the formula (3).

In the case where the compound containing a linking unit A represented by the formula (2) and a linking unit B represented by the formula (3) is used, the increase in viscosity during the processing is suppressed as compared to the case where polysulfide silane such as bis-(3-triethoxysilylpropyl)tetrasulfide is used. This is presumably because, since the sulfide moiety of the linking unit A is a C—S—C bond, the compound is thermally more stable than tetrasulfide or disulfide, and thus Mooney viscosity is less likely to greatly increase.

Further, the decrease in scorch time is suppressed as compared to the case where mercapto silane such as 3-mercaptopropyltrimethoxysilane is used. This is presumably because, though the linking unit B has a mercaptosilane structure, the —$C_7H_{15}$ moiety of the linking unit A covers the —SH group of the linking unit B, as a result of which the SH group is less likely to react with polymers and therefore scorch is less likely to occur.

From the viewpoint of enhancing the effects of suppressing the increase in viscosity during the processing and of suppressing the decrease in scorch time as mentioned above, the linking unit A content in the silane coupling agent having the aforementioned structure is preferably not less than 30 mol %, and more preferably not less than 50 mol %, whereas it is preferably not more than 99 mol %, and more preferably not more than 90 mol %. Also, the linking unit B content is preferably not less than 1 mol %, more preferably not less than 5 mol %, and still more preferably not less than 10 mol %, whereas it is preferably not more than 70 mol %, more preferably not more than 65 mol %, and still more preferably not more than 55 mol %. Moreover, the combined content of the linking unit A and the linking unit B is preferably not less than 95 mol %, more preferably not less than 98 mol %, and particularly preferably 100 mol %.

The linking unit A or B content refers to the amount including the linking unit A or B that is present at the terminal of the silane coupling agent, if any. In the case where the linking unit A or B is present at the terminal of the silane coupling agent, its form is not particularly limited as long as it forms a unit corresponding to the formula representing the linking unit A or the formula (3) representing the linking unit B.

Examples of the halogen atoms for $R^{201}$ include chlorine, bromine, and fluorine.

Examples of the branched or unbranched $C_{1-30}$ alkyl groups for $R^{201}$ include a methyl group, an ethyl group, an n-propyl group, an isopropyl group, an n-butyl group, an iso-butyl group, a sec-butyl group, a tert-butyl group, a pentyl group, a hexyl group, a heptyl group, a 2-ethylhexyl group, an octyl group, a nonyl group, and a decyl group. The alkyl group preferably has 1 to 12 carbon atom(s).

Examples of the branched or unbranched $C_{2-30}$ alkenyl groups for $R^{201}$ include a vinyl group, a 1-propenyl group, a 2-propenyl group, a 1-butenyl group, a 2-butenyl group, a 1-pentenyl group, a 2-pentenyl group, a 1-hexenyl group, a 2-hexenyl group, and a 1-octenyl group. The alkenyl group preferably has 2 to 12 carbon atoms.

Examples of the branched or unbranched $C_{2-30}$ alkynyl groups for $R^{201}$ include an ethynyl group, a propynyl group, a butynyl group, a pentynyl group, a hexynyl group, a heptynyl group, an octynyl group, a nonynyl group, a decynyl group, an undecynyl group, and a dodecynyl group. The alkynyl group preferably has 2 to 12 carbon atoms.

Examples of the branched or unbranched $C_{1-30}$ alkylene groups for $R^{202}$ include an ethylene group, a propylene group, a butylene group, a pentylene group, a hexylene group, a heptylene group, an octylene group, a nonylene group, a decylene group, an undecylene group, a dodecylene group, a tridecylene group, a tetradecylene group, a pentadecylene group, a hexadecylene group, a heptadecylene group, and an octadecylene group. The alkylene group preferably has 1 to 12 carbon atom(s).

Examples of the branched or unbranched $C_{2-30}$ alkenylene groups for $R^{202}$ include a vinylene group, a 1-propenylene group, a 2-propenylene group, a 1-butenylene group, a 2-butenylene group, a 1-pentenylene group, a 2-pentenylene group, a 1-hexenylene group, a 2-hexenylene group, and a 1-octenylene group. The alkenylene group preferably has 2 to 12 carbon atoms.

Examples of the branched or unbranched $C_{2-30}$ alkynylene groups for $R^{202}$ include an ethynylene group, a propynylene group, a butynylene group, a pentynylene group, a hexynylene group, a heptynylene group, an octynylene group, a nonynylene group, a decynylene group, an undecynylene group, and a dodecynylene group. The alkynylene group preferably has 2 to 12 carbon atoms.

In the compound containing the linking unit A represented by the formula (2) and the linking unit B represented by the formula (3), the total number of repetitions (x+y) of the number of repetitions (x) of the linking unit A and the number of repetitions (y) of the linking unit B is preferably in the range of 3 to 300. When the total number of repetitions falls within the range mentioned above, the —$C_7H_{15}$ moiety of the linking unit A covers the mercaptosilane of the linking unit B, which makes it possible not only to suppress the decrease in scorch time, but also to ensure good reactivity to silica and the rubber component.

Examples of the compounds containing the linking unit A represented by the formula (2) and the linking unit B represented by the formula (3) include NXT-Z30, NXT-Z45, and NXT-Z60 (produced by Momentive Performance Materials). These may be used alone, or two or more of these may be used in combination.

The amount of the mercapto group-containing silane coupling agent for each 100 parts by mass of silica is preferably not less than 1 part by mass, and more preferably not less than 3 parts by mass. If the amount is less than 1 part by mass, the resulting unvulcanized rubber composition may have so high viscosity that good processability cannot be ensured. Also, the amount of the mercapto group-containing silane coupling agent is preferably not more than 20 parts by mass, and more preferably not more than 10 parts by mass. If the amount exceeds 20 parts by mass, rubber strength tends to decrease.

The rubber composition of the present invention may include other silane coupling agents together with the mercapto group-containing silane coupling agent. Examples of other silane coupling agents include bis(3-triethoxysilylpropyl)tetrasulfide, bis(3-trimethoxysilylpropyl)tetrasulfide, and bis(2-triethoxysilylpropyl)tetrasulfide. These may be used alone or in any combinations of two or more. Preferred among these is bis(3-triethoxysilylpropyl)tetrasulfide as it is more effective in enhancing reinforcement and processability.

From the viewpoint of ensuring good processability, the amount of other silane coupling agents for each 100 parts by mass of silica is preferably not less than 0.5 parts by mass, and more preferably not less than 3 parts by mass, whereas it is preferably not more than 10 parts by mass. Also from the same viewpoint, the amount of other silane coupling agents is preferably less than the amount of the mercapto group-containing silane coupling agent.

The rubber composition of the present invention preferably includes a liquid resin having a softening point of −20 to 20° C. When the liquid resin is used together with the conjugated diene polymer, the effects of improving the properties can be synergistically enhanced; in particular, fuel economy and processability can be greatly improved. Further, when the liquid resin is used together with the mercapto group-containing silane coupling agent, or the silica (1) and silica (2), the effects of improving the properties can further be enhanced.

The liquid resin has a lower softening point than solid resins, and is in a liquid form at 70° C., at which there is considered to be a correlation with rolling resistance properties. Thus, it is considered that the use of the liquid resin allows polymers to easily move, which reduces energy loss so that fuel economy can be improved.

Examples of the liquid resins include liquid petroleum or coal resins such as liquid coumarone-indene resin, liquid indene resin, liquid α-methylstyrene resin, liquid vinyltoluene resin, and liquid polyisopentane resin. Liquid coumarone-indene resin is preferred among these as it is more effective in improving fuel economy.

The liquid resin has a softening point of not lower than −20° C., preferably not lower than −5° C., and more preferably not lower than 0° C. A liquid resin having a softening point lower than −20° C. tends to have too low a viscosity and thus to be poorly mixed with the rubber component. Also, the liquid resin has a softening point of not higher than 20° C., preferably not higher than 19° C., and more preferably not higher than 17° C. A liquid resin having a softening point higher than 20° C. tends to increase energy loss so that fuel economy can be deteriorated.

Herein, the softening point is measured as set forth in JIS K 6220-1:2001 with a ring and ball softening point apparatus. The temperature at which the ball drops down is determined as the softening point.

The amount of the liquid resin for each 100 parts by mass of the rubber component is preferably not less than 1 part by mass, and more preferably not less than 2 parts by mass. If the amount is less than 1 part by mass, fuel economy may not be sufficiently improved. Also, the amount of the liquid resin is preferably not more than 10 parts by mass, and more preferably not more than 8 parts by mass. If the amount is more than 10 parts by mass, while good processability is achieved, fuel economy tends to deteriorate.

Known additives may be used, and examples thereof include vulcanizing agents such as sulfur; vulcanization accelerators such as thiazole vulcanization accelerators, thiuram vulcanization accelerators, sulfenamide vulcanization accelerators, and guanidine vulcanization accelerators; vulcanization activators such as stearic acid and zinc oxide; organic peroxides; fillers such as carbon black, calcium carbonate, talc, alumina, clay, aluminum hydroxide, and mica; processing aids such as extender oils and lubricants; and antioxidants.

Examples of the carbon black include furnace black (furnace carbon black) such as SAF, ISAF, HAF, MAF, FEF, SRF, GPF, APF, FF, CF, SCF or ECF; acetylene black (acetylene carbon black); thermal black (thermal carbon black) such as FT or MT; channel black (channel carbon black) such as EPC, MPC or CC; and graphite. These may be used alone, or two or more of these may be used in combination.

The amount of carbon black for each 100 parts by mass of the rubber component is preferably not less than 1 part by mass, and more preferably not less than 3 parts by mass. If the amount is less than 1 part by mass, a sufficient reinforcement may not be achieved. The amount of carbon black is preferably not more than 90 parts by mass, and more preferably not more than 85 parts by mass. If the amount is more than 90 parts by mass, fuel economy tends to deteriorate.

The nitrogen adsorption specific surface area ($N_2SA$) of carbon black is usually 5 to 200 $m^2/g$, and preferably the lower limit and the upper limit thereof are 50 $m^2/g$ and 150 $m^2/g$, respectively. The dibutyl phthalate (DBP) absorption of carbon black is usually 5 to 300 mL/100 g, and preferably the lower limit and the upper limit thereof are 80 mL/100 g and 180 mL/100 g, respectively. If the $N_2SA$ or DBP absorption of carbon black is lower than the lower limit of the range mentioned above, the reinforcement effect tends to be small and thus tensile strength at break tends to decrease. If the $N_2SA$ or DBP absorption of carbon black is larger than the upper limit of the range mentioned above, the carbon black tends to poorly disperse and thus hysteresis loss tends to increase so that fuel economy can be reduced. The nitrogen adsorption specific surface area is measured in accordance with ASTM D4820-93. The DBP absorption is measured in accordance with ASTM D2414-93. Examples of commercially available carbon blacks include SEAST 6, SEAST 7HM, and SEAST KH (trade name, produced by Tokai Carbon Co., Ltd.), and CK 3 and Special Black 4A (trade name, produced by Evonik Degussa).

Examples of the extender oils include aromatic mineral oils (viscosity gravity constant (V.G.C. value): 0.900 to 1.049), naphthenic mineral oils (V.G.C. value: 0.850 to 0.899), and paraffinic mineral oils (V.G.C. value: 0.790 to 0.849). The polycyclic aromatics content in the extender oil is preferably less than 3% by mass, and more preferably less than 1% by mass. The polycyclic aromatics content is measured according to the British Institute of Petroleum 346/92 method. The aromatic compound content (CA) in the extender oil is preferably not less than 20% by mass. Two or more kinds of these extender oils may be used in combination.

Examples of the vulcanization accelerators include thiazole vulcanization accelerators such as 2-mercaptobenzothiazole, dibenzothiazyl disulfide, and N-cyclohexyl-2-benzothiazylsulfenamide; thiuram vulcanization accelerators such as tetramethylthiuram monosulfide and tetramethylthiuram disulfide; sulfenamide vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine vulcanization accelerators such as diphenylguanidine, diorthotolylguanidine, and orthotolylbiguanidine. The amount thereof is preferably 0.1 to 5 parts by mass, and more preferably 0.2 to 3 parts by mass, for each 100 parts by mass of the rubber component.

The rubber composition may be prepared from the conjugated diene polymer combined with other rubber materials, additives and the like according to a known method, for example, by kneading components with a known mixer such as a roll mill or a Banbury mixer.

With regard to the kneading conditions when additives other than vulcanizing agents and vulcanization accelerators are mixed, the kneading temperature is usually 50 to 200° C., preferably 80 to 190° C., and the kneading time is usually 30 seconds to 30 minutes, preferably 1 minute to 30 minutes.

When a vulcanizing agent and a vulcanization accelerator are mixed, the kneading temperature is usually not higher than 100° C., and preferably ranges from room temperature to 80° C. The composition containing a vulcanizing agent and a vulcanization accelerator is usually used after it is vulcanized by press vulcanization or the like. The vulcanization temperature is usually 120 to 200° C., preferably 140 to 180° C.

The rubber composition of the present invention is excellent in the balance among fuel economy, tensile strength at break, and processability, and thus is significantly effective in improving these properties.

The rubber composition of the present invention can be used for various components of a tire, and suitably used in a base tread.

The pneumatic tire of the present invention can be prepared by a conventional method. Specifically, the rubber composition is processed by a method generally employed to form a tread of a tire, for example, by kneading the rubber composition with a roll mill, a Banbury mixer, a kneader, or the like to give an unvulcanized rubber composition, subsequently extruding and processing the unvulcanized rubber composition into a two-layer tread consisting of a base tread and a cap tread, followed by assembling with other components on a tire building machine in a conventional manner to build an unvulcanized tire. Then, the unvulcanized tire is heated and pressed in a vulcanizer to provide a pneumatic tire of the present invention.

The pneumatic tire of the present invention can be suitably used as a tire for passenger vehicles.

EXAMPLES

The present invention is more specifically described with reference to examples. However, the present invention is not limited thereto.

The following is a list of the chemical agents used in the synthesis or polymerization. The chemical agents were purified, if needed, by usual methods.

THF: anhydrous tetrahydrofuran, produced by Kanto Chemical Co., Inc.

Sodium hydride: produced by Kanto Chemical Co., Inc.

Diethylamine: produced by Kanto Chemical Co., Inc.

Methylvinyldichlorosilane: produced by Shin-Etsu Chemical Co., Ltd.

Anhydrous hexane: produced by Kanto Chemical Co., Inc.

Styrene: produced by Kanto Chemical Co., Inc.

Butadiene: 1,3-butadiene, produced by Tokyo Chemical Industry Co., Ltd.

TMEDA: tetramethylethylenediamine, produced by Kanto Chemical Co., Inc.

n-Butyllithium solution: 1.6 M n-butyllithium in hexane, produced by Kanto Chemical Co., Inc.

Initiator (1): AI-200CE2 (compound formed by bonding 3-(N,N-dimethylamino)-1-propyllithium and two isoprene-derived structural units, represented by the following formula) (0.9 M), produced by FMC

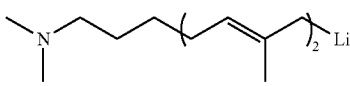

Piperidine: produced by Tokyo Chemical Industry Co., Ltd.
Diamylamine: produced by Tokyo Chemical Industry Co., Ltd.
2,6-Di-tert-butyl-p-cresol: Nocrac 200, produced by Ouchi Shinko Chemical Industrial Co., Ltd.
Bis(dimethylamino)methylvinylsilane: produced by Shin-Etsu Chemical Co., Ltd.
N,N-dimethylaminopropylacrylamide: produced by Tokyo Chemical Industry Co., Ltd.
3-Diethylaminopropyltriethoxysilane: produced by Azmax Co
1,3-Dimethyl-2-imidazolidinone: produced by Tokyo Chemical Industry Co., Ltd.
Tris[3-(trimethoxysilyl)propyl]isocyanurate: produced by Shin-Etsu Chemical Co., Ltd.
N,N-dimethylformamide dimethyl acetal: produced by Tokyo Chemical Industry Co., Ltd.
1,3-Diisopropenylbenzene: produced by Tokyo Chemical Industry Co., Ltd.
sec-Butyllithium solution: produced by Kanto Chemical Co., Inc. (1.0 mol/L)
Cyclohexane: produced by Kanto Chemical Co., Inc.
<Preparation of Modifier (1) (Terminal Modifier)>
In a nitrogen atmosphere, 15.6 g of N-(3-dimethylaminopropyl)acrylamide was charged into a 100-mL volumetric flask, and anhydrous hexane was also added to increase the total amount to 100 mL. In this manner, a modifier (1) was prepared.
<Preparation of Modifier (2) (Main Chain Modifier)>
THF (1000 mL) and sodium hydride (13 g) were charged into a sufficiently nitrogen-purged 2-L three-necked flask, and diethylamine (36.5 g) was slowly added dropwise thereto on an ice water bath while stirring. After stirring for 30 minutes, methylvinyldichlorosilane (36 g) was added dropwise over 30 minutes, followed by stirring for 2 hours. The resulting solution was concentrated, filtered, and purified by distillation under reduced pressure to synthesize bis(diethylamino)methylvinylsilane. The bis(diethylamino)methylvinylsilane (21.4 g) was charged into a 100-mL volumetric flask in a nitrogen atmosphere, and anhydrous hexane was also added to increase the total amount to 100 mL.
<Preparation of Modifier (3) (Terminal Modifier)>
In a nitrogen atmosphere, 3-diethylaminopropyltriethoxysilane (27.7 g) was charged into a 100-mL volumetric flask, and anhydrous hexane was also added to increase the total amount to 100 mL. In this manner, a modifier (3) was prepared.
<Preparation of Modifier (4) (Terminal Modifier)>
In a nitrogen atmosphere, 1,3-dimethyl-2-imidazolidinone (11.4 g) was charged into a 100-mL volumetric flask, and anhydrous hexane was also added to increase the total amount to 100 mL. In this manner, a modifier (4) was prepared.
<Preparation of Modifier (5) (Terminal Modifier)>
In a nitrogen atmosphere, tris[3-(trimethoxysilyl)propyl]isocyanurate (30.7 g) was charged into a 100-mL volumetric flask, and anhydrous hexane was also added to increase the total amount to 200 mL. In this manner, a modifier (5) was prepared.
<Preparation of Modifier (6) (Terminal Modifier)>
In a nitrogen atmosphere, N,N-dimethylformamide dimethyl acetal (11.9 g) was charged into a 100-mL volumetric flask, and anhydrous hexane was also added to increase the total amount to 200 mL. In this manner, a modifier (6) was prepared.
<Copolymer Analysis>
Copolymers (conjugated diene polymers) obtained as mentioned later were analyzed by the following methods.
<Measurement of Weight-Average Molecular Weight (Mw) and Number-Average Molecular Weight (Mn)>
The weight-average molecular weight (Mw) and number-average molecular weight (Mn) of each copolymer were measured using gel permeation chromatography (GPC) (GPC-8000 series produced by Tosoh Corporation, detector: differential refractometer, column: TSKGEL SUPERMULTIPORE HZ-M produced by Tosoh Corporation), and expressed relative to polystyrene standards. A molecular weight distribution Mw/Mn was calculated from the measurement results.
<Structural Identification of Copolymers>
The structures (styrene content, vinyl content) of copolymers were identified with a device of JNM-ECA series produced by JEOL Ltd. Each polymer (0.1 g) was dissolved in toluene (15 mL), and the solution was slowly poured in methanol (30 mL) for reprecipitation. The resulting precipitate was dried under reduced pressure and then measured.
<Synthesis of Copolymer (1)>
n-Hexane (18 L), styrene (600 g), butadiene (1400 g), the modifier (2) (40 mL), and TMEDA (10 mmol) were charged into a sufficiently nitrogen-purged 30-L pressure resistant container, and heated to 40° C. After further addition of the initiator (1) (19 mL), the mixture was heated to 50° C., and stirred for 3 hours. Next, the modifier (1) (20 mL) was added, followed by stirring for 30 minutes. The reaction solution was mixed with methanol (15 mL) and 2,6-tert-butyl-p-cresol (0.1 g). Then, a coagulum was recovered from the polymer solution by steam stripping treatment, and the coagulum was dried under reduced pressure for 24 hours to give a copolymer (1). Here, 0.43 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (1)) containing a nitrogen atom and/or a silicon atom was introduced per mol of the alkali metal derived from the polymerization initiator introduced.
<Synthesis of Copolymer (2)>
A copolymer (2) was prepared based on the same formulation as that for the synthesis of the copolymer (1), except that an n-butyllithium solution (10.6 mL) was used instead of the initiator (1) (19 mL). Here, 0.43 g of the silicon-containing vinyl compound (modifier (2)) was introduced for each 100 g of the monomer component; and 1.18 mol of the compound (modifier (1)) containing a nitrogen atom and/or a silicon atom was introduced per mol of the alkali metal derived from the polymerization initiator introduced.
<Synthesis of Copolymer (3)>
n-Hexane (18 L), styrene (600 g), butadiene (1400 g), and TMEDA (10 mmol) were charged into a sufficiently nitrogen-purged 30-L pressure resistant container, and heated to 40° C. After further addition of an n-butyllithium solution (11 mL), the mixture was heated to 50° C., and stirred for 3 hours. Next, the reaction solution was mixed with methanol (1 mL) and 2,6-tert-butyl-p-cresol (0.1 g). Then, a coagulum was recovered from the polymer solution by steam stripping treatment, and the coagulum was dried under reduced pressure for 24 hours to give a copolymer (3).

<Synthesis of Copolymer (4)>
A copolymer (4) was prepared based on the same formulation as that for the synthesis of the copolymer (1), except that a coagulum was recovered from the polymer solution by, instead of steam stripping treatment, evaporating the polymer solution at room temperature for 24 hours, followed by drying under reduced pressure. Here, 0.43 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (1)) containing a nitrogen atom and/or a silicon atom was introduced per mol of the alkali metal derived from the polymerization initiator introduced.

<Synthesis of Copolymer (5)>
A copolymer (5) was prepared based on the same formulation as that for the synthesis of the copolymer (1), except that the amounts of the modifier (2) (40 mL) and the modifier (1) (20 mL) were both changed to 0 mL. Here, 8.5 mmol of the polymerization initiator (initiator (1)) was introduced for each 100 g of the monomer component.

<Synthesis of Copolymer (6)>
A copolymer (6) was prepared based on the same formulation as that for the synthesis of the copolymer (1), except that an n-butyllithium solution (6.8 mL) was used instead of the initiator (1) (19 mL), and the amount of the modifier (1) was changed from 20 mL to 0 mL. Here, 0.43 g of the silicon-containing vinyl compound (modifier (2)) was introduced for each 100 g of the monomer component.

<Synthesis of Copolymer (7)>
A copolymer (7) was prepared based on the same formulation as that for the synthesis of the copolymer (1), except that the modifier (3) (20 mL) was used instead of the modifier (1) (20 mL). Here, 0.32 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (3)) containing a nitrogen atom and/or a silicon atom was introduced per mol of the alkali metal derived from the polymerization initiator introduced.

<Synthesis of Copolymer (8)>
A copolymer (8) was prepared based on the same formulation as that for the synthesis of the copolymer (7), except that a coagulum was recovered from the polymer solution by, instead of steam stripping treatment, evaporating the polymer solution at room temperature for 24 hours, followed by drying under reduced pressure. Here, 0.32 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (3)) containing a nitrogen atom and/or a silicon atom was introduced per mol of the alkali metal derived from the polymerization initiator introduced.

<Synthesis of Copolymer (9)>
A copolymer (9) was prepared based on the same formulation as that for the synthesis of the copolymer (7), except that an n-butyllithium solution (10.6 mL) was used instead of the initiator (1) (19 mL), and the amount of the modifier (2) was changed from 40 mL to 0 mL. Here, 1.18 mol of the compound (modifier (3)) containing a nitrogen atom and/or a silicon atom was introduced per mol of the alkali metal derived from the polymerization initiator introduced.

<Synthesis of Copolymer (10)>
A copolymer (10) was prepared based on the same formulation as that for the synthesis of the copolymer (1), except that the amounts of styrene and butadiene were changed to 0 g and 2000 g, respectively; THF (5 mmol) was used instead of TMEDA (10 mmol); and the amount of the initiator (1) was changed from 19 mL to 23 mL. Here, 0.43 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (1)) containing a nitrogen atom and/or a silicon atom was introduced per mol of the alkali metal derived from the polymerization initiator introduced.

<Synthesis of Copolymer (11)>
A copolymer (11) was prepared based on the same formulation as that for the synthesis of the copolymer (10), except that a coagulum was recovered from the polymer solution by, instead of steam stripping treatment, evaporating the polymer solution at room temperature for 24 hours, followed by drying under reduced pressure. Here, 0.43 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (1)) containing a nitrogen atom and/or a silicon atom was introduced per mol of the alkali metal derived from the polymerization initiator introduced.

<Synthesis of Copolymer (12)>
A copolymer (12) was prepared based on the same formulation as that for the synthesis of the copolymer (1), except that the modifier (4) (20 mL) was used instead of the modifier (1) (20 mL). Here, 0.32 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (4)) containing a nitrogen atom and/or a silicon atom was introduced per mol of the alkali metal derived from the polymerization initiator introduced.

<Synthesis of Copolymer (13)>
A copolymer (13) was prepared based on the same formulation as that for the synthesis of the copolymer (12), except that a coagulum was recovered from the polymer solution by, instead of steam stripping treatment, evaporating the polymer solution at room temperature for 24 hours, followed by drying under reduced pressure. Here, 0.32 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (4)) containing a nitrogen atom and/or a silicon atom was introduced per mol of the alkali metal derived from the polymerization initiator introduced.

<Synthesis of Copolymer (14)>
A copolymer (14) was prepared based on the same formulation as that for the synthesis of the copolymer (12), except that an n-butyllithium solution (10.6 mL) was used instead of the initiator (1) (19 mL), and the amount of the modifier (2) was changed from 40 mL to 0 mL. Here, 1.18 mol of the compound (modifier (4)) containing a nitrogen atom and/or a silicon atom was introduced per mol of the alkali metal derived from the polymerization initiator introduced.

<Synthesis of Copolymer (15)>
A copolymer (15) was prepared based on the same formulation as that for the synthesis of the copolymer (1), except that the modifier (5) (20 mL) was used instead of the modifier (1) (20 mL). Here, 0.32 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (5)) containing a nitrogen atom and/or a silicon atom was introduced per mol of the alkali metal derived from the polymerization initiator introduced.

<Synthesis of Copolymer (16)>

A copolymer (16) was prepared based on the same formulation as that for the synthesis of the copolymer (15), except that a coagulum was recovered from the polymer solution by, instead of steam stripping treatment, evaporating the polymer solution at room temperature for 24 hours, followed by drying under reduced pressure. Here, 0.32 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (5)) containing a nitrogen atom and/or a silicon atom was introduced per mol of the alkali metal derived from the polymerization initiator introduced.

<Synthesis of Copolymer (17)>

A copolymer (17) was prepared based on the same formulation as that for the synthesis of the copolymer (15), except that an n-butyllithium solution (10.6 mL) was used instead of the initiator (1) (19 mL), and the amount of the modifier (2) was changed from 40 mL to 0 mL. Here, 1.18 mol of the compound (modifier (5)) containing a nitrogen atom and/or a silicon atom was introduced per mol of the alkali metal derived from the polymerization initiator introduced.

<Synthesis of Copolymer (18)>

A copolymer (18) was prepared based on the same formulation as that for the synthesis of the copolymer (1), except that the modifier (6) (20 mL) was used instead of the modifier (1) (20 mL). Here, 0.32 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (6)) containing a nitrogen atom and/or a silicon atom was introduced per mol of the alkali metal derived from the polymerization initiator introduced.

<Synthesis of Copolymer (19)>

A copolymer (19) was prepared based on the same formulation as that for the synthesis of the copolymer (18), except that a coagulum was recovered from the polymer solution by, instead of steam stripping treatment, evaporating the polymer solution at room temperature for 24 hours, followed by drying under reduced pressure. Here, 0.32 g of the silicon-containing vinyl compound (modifier (2)) was introduced for each 100 g of the monomer component; 0.85 mmol of the polymerization initiator (initiator (1)) was introduced for each 100 g of the monomer component; and 1.18 mol of the compound (modifier (6)) containing a nitrogen atom and/or a silicon atom was introduced per mol of the alkali metal derived from the polymerization initiator introduced.

<Synthesis of Copolymer (20)>

A copolymer (20) was prepared based on the same formulation as that for the synthesis of the copolymer (18), except that an n-butyllithium solution (10.6 mL) was used instead of the initiator (1) (19 mL), and the amount of the modifier (2) was changed from 40 mL to 0 mL. Here, 1.18 mol of the compound (modifier (6)) containing a nitrogen atom and/or a silicon atom was introduced per mol of the alkali metal derived from the polymerization initiator introduced.

Table 1 summarizes the monomer components and others of the copolymers (1) to (20).

TABLE 1

| Copolymer | Initiator | Monomer component | Terminal modifier | Styrene content (% by mass) | Vinyl content (mol %) | Molecular weight distribution Mw/Mn | Molecular weight Mw (unit: ten thousand) |
|---|---|---|---|---|---|---|---|
| Copolymer (1) | Initiator (1) | Styrene, 1,3-Butadiene, Modifier (2) | Modifier (1) | 30 | 56 | 1.18 | 26.0 |
| Copolymer (2) | n-Butyllithium solution | Styrene, 1,3-Butadiene, Modifier (2) | Modifier (1) | 30 | 55 | 1.17 | 24.5 |
| Copolymer (3) | n-Butyllithium solution | Styrene, 1,3-Butadiene | Not added | 30 | 56 | 1.09 | 26.5 |
| Copolymer (4) | Initiator (1) | Styrene, 1,3-Butadiene, Modifier (2) | Modifier (1) | 30 | 57 | 1.19 | 25.2 |
| Copolymer (5) | Initiator (1) | Styrene, 1,3-Butadiene | Not added | 30 | 57 | 1.16 | 26.1 |
| Copolymer (6) | n-Butyllithium solution | Styrene, 1,3-Butadiene, Modifier (2) | Not added | 30 | 56 | 1.13 | 27.9 |
| Copolymer (7) | Initiator (1) | Styrene, 1,3-Butadiene, Modifier (2) | Modifier (3) | 30 | 56 | 1.20 | 25.8 |
| Copolymer (8) | Initiator (1) | Styrene, 1,3-Butadiene, Modifier (2) | Modifier (3) | 30 | 58 | 1.18 | 26.2 |
| Copolymer (9) | n-Butyllithium solution | Styrene, 1,3-Butadiene | Modifier (3) | 30 | 56 | 1.14 | 27.1 |
| Copolymer (10) | Initiator (1) | 1,3-Butadiene, Modifier (2) | Modifier (1) | 0 | 14.2 | 1.19 | 26.2 |
| Copolymer (11) | Initiator (1) | 1,3-Butadiene, Modifier (2) | Modifier (1) | 0 | 14 | 1.21 | 26.3 |
| Copolymer (12) | Initiator (1) | Styrene, 1,3-Butadiene, Modifier (2) | Modifier (4) | 30 | 56 | 1.13 | 25.6 |
| Copolymer (13) | Initiator (1) | Styrene, 1,3-Butadiene, Modifier (2) | Modifier (4) | 30 | 56 | 1.10 | 25.5 |
| Copolymer (14) | n-Butyllithium solution | Styrene, 1,3-Butadiene | Modifier (4) | 30 | 55 | 1.09 | 26.3 |
| Copolymer (15) | Initiator (1) | Styrene, 1,3-Butadiene, Modifier (2) | Modifier (5) | 30 | 56 | 1.22 | 28.3 |
| Copolymer (16) | Initiator (1) | Styrene, 1,3-Butadiene, Modifier (2) | Modifier (5) | 30 | 57 | 1.18 | 28.0 |
| Copolymer (17) | n-Butyllithium solution | Styrene, 1,3-Butadiene | Modifier (5) | 30 | 56 | 1.16 | 27.3 |
| Copolymer (18) | Initiator (1) | Styrene, 1,3-Butadiene, Modifier (2) | Modifier (6) | 30 | 57 | 1.18 | 26.8 |

TABLE 1-continued

| Copolymer | Initiator | Monomer component | Terminal modifier | Styrene content (% by mass) | Vinyl content (mol %) | Molecular weight distribution Mw/Mn | Molecular weight Mw (unit: ten thousand) |
|---|---|---|---|---|---|---|---|
| Copolymer (19) | Initiator (1) | Styrene, 1,3-Butadiene, Modifier (2) | Modifier (6) | 30 | 56 | 1.20 | 28.1 |
| Copolymer (20) | n-Butyllithium solution | Styrene, 1,3-Butadiene | Modifier (6) | 30 | 57 | 1.17 | 27.1 |

The following describes the chemicals used in the examples and comparative examples.
Natural Rubber: TSR20
Copolymers (1) to (20): synthesized as above
Polybutadiene rubber: UBEPOL BR150B produced by Ube Industries, Ltd.
Silica 1: ULTRASIL 360 ($N_2SA$: 50 $m^2/g$) produced by Evonik Degussa
Silica 2: ZEOSIL 1205 MP ($N_2SA$: 200 $m^2/g$) produced by Rhodia
Silane coupling agent 1: Si69 (bis(3-triethoxysilylpropyl)tetrasulfide) produced by Evonik Degussa
Silane coupling agent 2: NXT-Z45 (a compound containing linking unit A and linking unit B (linking unit A: 55 mol %, linking unit B: 45 mol %)) produced by Momentive Performance Materials
Silane coupling agent 3: Si363 produced by Evonik Degussa
Carbon black: Diablack N339 ($N_2SA$: 96 $m^2/g$, DBP absorption: 124 mL/100 g) produced by Mitsubishi Chemical Corporation
Oil: X-140 produced by JX Nippon Oil & Energy Corporation
Solid resin: Escorez 1102 produced by Exxon Mobil Corporation
Liquid resin: NOVARES C10 (liquid coumarone-indene resin, softening point: 5 to 15° C.) produced by Rutgers Chemicals
Antioxidant: Antigene 6C produced by Sumitomo Chemical Co., Ltd
Stearic acid: TSUBAKI stearic acid beads produced by NOF Corporation
Zinc oxide: Zinc oxide #1 produced by Mitsui Mining & Smelting Co., Ltd.
Wax: Sunnoc N produced by Ouchi Shinko Chemical Industrial Co., Ltd.
Sulfur: sulfur powder produced by Tsurumi Chemical Industry Co., Ltd.
Vulcanization accelerator: Soxinol CD produced by Sumitomo Chemical Co., Ltd.

Examples and Comparative Examples

According to each of the formulations shown in Tables 2 to 11, the materials other than the sulfur and vulcanization accelerator were kneaded for 5 minutes at 150° C. using a 1.7-L Banbury mixer (produced by Kobe Steel, Ltd.) to give a kneadate. The sulfur and vulcanization accelerator were then added to the kneadate, followed by kneading for 5 minutes at 80° C. using an open roll mill to give an unvulcanized rubber composition. The unvulcanized rubber composition was press-vulcanized for 20 minutes at 170° C. in a 0.5 mm-thick mold to obtain a vulcanized rubber composition.

Separately, the unvulcanized rubber composition was formed into a base tread shape and assembled with other tire components on a tire building machine to build an unvulcanized tire. The unvulcanized tire was vulcanized for 12 minutes at 170° C. to prepare a test tire (size: 195/65R15).

<Evaluation Items and Test Methods>

In the evaluation items below, Comparative Example 1 was taken as a standard comparative example in Tables 2, 4, 5, 6, 8, 9 and 11; and Comparative Example 9 was taken as a standard comparative example in Tables 3, 7 and 10.

<Tan δ>

The tan δ of each vulcanized rubber composition was measured with a spectrometer (produced by Ueshima Seisakusho Co., Ltd.) at a dynamic strain amplitude of 1%, a frequency of 10 Hz, and a temperature of 50° C. The reciprocal of the tan δ value is expressed as an index relative to that in the standard comparative example (=100). A higher index indicates a lower rolling resistance, which in turn indicates better fuel economy.

<Rolling Resistance>

The rolling resistance was measured with a rolling resistance tester by running each test tire with a 15×6JJ rim at an internal pressure of 230 kPa, a load of 3.43 kN, and a speed of 80 km/h. The measured rolling resistance is expressed as an index relative to that in the standard comparative example (=100). A higher index indicates a lower rolling resistance, which in turn indicates better fuel economy.

<Breaking Energy>

A No. 3 dumbbell test piece formed of each vulcanized rubber composition was subjected to tensile tests in accordance with JIS K 6251:2010 "Rubber, vulcanized or thermoplastic—Determination of tensile stress-strain properties" to measure the tensile strength at break (TB) and elongation at break (EB). Then, a breaking energy (TB×EB/2) was calculated. The breaking energy of each formulation is expressed as an index relative to that in the standard comparative example (=100), using the equation below. A higher index indicates higher tensile strength at break.

(Breaking energy index)=(Breaking energy of each formulation)/(Breaking energy of standard comparative example)×100

<Mooney Viscosity>

The Mooney viscosity ($ML_{1+4}$/130° C.) of each unvulcanized rubber composition was determined in accordance with JIS K6300-1:2001 "Rubber, unvulcanized—Physical property—Part 1: Determination of Mooney viscosity and pre-vulcanization characteristics with Mooney viscometer" using a Mooney viscosity tester. That is, under a temperature condition of 130° C. achieved by 1 minute pre-heating, the Mooney viscosity of the unvulcanized rubber composition was measured after a small rotor was rotated for 4 minutes.

The result is expressed as an index. A higher index indicates a lower Mooney viscosity, which in turn indicates better processability (kneading processability). The index was calculated according to the following equation.

(Mooney viscosity index)=(Mooney viscosity of standard comparative example)/(Mooney viscosity of each formulation)×100

<Processability of Unvulcanized Rubber Sheet>

Each unvulcanized rubber composition was extrusion-molded into a rubber sheet having a thickness of 1.0 mm with a roll. The texture of the rubber sheet was checked. Rubber sheets with no edge cuts and no problem with texture were given a rating of "good", and those which are not were given a rating of "poor".

TABLE 2

|  |  | Comparative Example |  |  |  |  |  |  |  | Example |  |
|---|---|---|---|---|---|---|---|---|---|---|---|
|  |  | 1 | 2 | 3 | 4 | 5 | 6 | 7 | 8 | 1 | 2 |
| Formulation (parts by mass) | Natural rubber | 20 | 20 | 20 | 20 | 20 | 20 | 20 | 20 | 20 | 20 |
|  | Copolymer (3) | 80 | — | — | — | — | — | — | — | — | — |
|  | Copolymer (6) | — | 80 | — | — | — | — | — | — | — | — |
|  | Copolymer (2) | — | — | 80 | — | — | 80 | 80 | 80 | — | — |
|  | Copolymer (9) | — | — | — | 80 | — | — | — | — | — | — |
|  | Copolymer (5) | — | — | — | — | 80 | — | — | — | — | — |
|  | Copolymer (1) | — | — | — | — | — | — | — | — | 80 | — |
|  | Copolymer (4) | — | — | — | — | — | — | — | — | — | 80 |
|  | Copolymer (7) | — | — | — | — | — | — | — | — | — | — |
|  | Copolymer (8) | — | — | — | — | — | — | — | — | — | — |
|  | Silica 1 | 20 | 20 | 20 | 20 | 20 | 60 | — | 30 | 20 | 20 |
|  | Silica 2 | — | — | — | — | — | — | 60 | 30 | — | — |
|  | Silane coupling agent 1 | 1.6 | 1.6 | 1.6 | 1.6 | 1.6 | 4.8 | 4.8 | 4.8 | 1.6 | 1.6 |
|  | Carbon black | 45 | 45 | 45 | 45 | 45 | 5 | 5 | 5 | 45 | 45 |
|  | Oil | 6.5 | 6.5 | 6.5 | 6.5 | 6.5 | 6.5 | 6.5 | 6.5 | 6.5 | 6.5 |
|  | Liquid resin | — | — | — | — | — | — | — | — | — | — |
|  | Antioxidant | 2.5 | 2.5 | 2.5 | 2.5 | 2.5 | 2.5 | 2.5 | 2.5 | 2.5 | 2.5 |
|  | Stearic acid | 1 | 1 | 1 | 1 | 1 | 1 | 1 | 1 | 1 | 1 |
|  | Zinc oxide | 2.5 | 2.5 | 2.5 | 2.5 | 2.5 | 2.5 | 2.5 | 2.5 | 2.5 | 2.5 |
|  | Wax | 1.5 | 1.5 | 1.5 | 1.5 | 1.5 | 1.5 | 1.5 | 1.5 | 1.5 | 1.5 |
|  | Sulfur | 3 | 3 | 3 | 3 | 3 | 3 | 3 | 3 | 3 | 3 |
|  | Vulcanization accelerator | 1.5 | 1.5 | 1.5 | 1.5 | 1.5 | 1.5 | 1.5 | 1.5 | 1.5 | 1.5 |
| Evaluation | tan δ index | 100 | 106 | 106 | 108 | 107 | 97 | 110 | 117 | 144 | 114 |
|  | Rolling resistance index | 100 | 102 | 102 | 101 | 104 | 98 | 109 | 112 | 128 | 111 |
|  | Breaking energy index | 100 | 95 | 102 | 96 | 96 | 99 | 108 | 110 | 105 | 104 |
|  | Mooney viscosity index | 100 | 97 | 102 | 99 | 99 | 105 | 90 | 94 | 103 | 107 |
|  | Processability of unvulcanized rubber sheet | good | poor | good | poor | poor | good | poor | poor | good | good |

|  |  | Example |  |  |  |  |  |  |  |  |  |
|---|---|---|---|---|---|---|---|---|---|---|---|
|  |  | 3 | 4 | 5 | 6 | 7 | 8 | 9 | 10 | 11 | 12 |
| Formulation (parts by mass) | Natural rubber | 20 | 20 | 20 | 20 | 20 | 20 | 20 | 20 | 20 | 20 |
|  | Copolymer (3) | — | — | — | — | — | — | — | — | — | — |
|  | Copolymer (6) | — | — | — | — | — | — | — | — | — | — |
|  | Copolymer (2) | — | — | — | — | — | — | — | — | — | — |
|  | Copolymer (9) | — | — | — | — | — | — | — | — | — | — |
|  | Copolymer (5) | — | — | — | — | — | — | — | — | — | — |
|  | Copolymer (1) | — | — | 80 | — | — | — | 80 | — | — | — |
|  | Copolymer (4) | — | — | — | 80 | — | — | — | 80 | — | — |
|  | Copolymer (7) | 80 | — | — | — | 80 | — | — | — | 80 | — |
|  | Copolymer (8) | — | 80 | — | — | — | 80 | — | — | — | 80 |
|  | Silica 1 | 20 | 20 | 30 | 30 | 30 | 30 | 30 | 30 | 30 | 30 |
|  | Silica 2 | — | — | 30 | 30 | 30 | 30 | 30 | 30 | 30 | 30 |
|  | Silane coupling agent 1 | 1.6 | 1.6 | 4.8 | 4.8 | 4.8 | 4.8 | 4.8 | 4.8 | 4.8 | 4.8 |
|  | Carbon black | 45 | 45 | 5 | 5 | 5 | 5 | 5 | 5 | 5 | 5 |
|  | Oil | 6.5 | 6.5 | 6.5 | 6.5 | 6.5 | 6.5 | — | — | — | — |
|  | Liquid resin | — | — | — | — | — | — | 6.5 | 6.5 | 6.5 | 6.5 |
|  | Antioxidant | 2.5 | 2.5 | 2.5 | 2.5 | 2.5 | 2.5 | 2.5 | 2.5 | 2.5 | 2.5 |
|  | Stearic acid | 1 | 1 | 1 | 1 | 1 | 1 | 1 | 1 | 1 | 1 |
|  | Zinc oxide | 2.5 | 2.5 | 2.5 | 2.5 | 2.5 | 2.5 | 2.5 | 2.5 | 2.5 | 2.5 |
|  | Wax | 1.5 | 1.5 | 1.5 | 1.5 | 1.5 | 1.5 | 1.5 | 1.5 | 1.5 | 1.5 |
|  | Sulfur | 3 | 3 | 3 | 3 | 3 | 3 | 3 | 3 | 3 | 3 |
|  | Vulcanization accelerator | 1.5 | 1.5 | 1.5 | 1.5 | 1.5 | 1.5 | 1.5 | 1.5 | 1.5 | 1.5 |
| Evaluation | tan δ index | 123 | 113 | 158 | 125 | 135 | 124 | 160 | 126 | 136 | 128 |
|  | Rolling resistance index | 111 | 108 | 141 | 122 | 122 | 119 | 144 | 123 | 127 | 123 |
|  | Breaking energy index | 108 | 110 | 113 | 112 | 117 | 119 | 113 | 112 | 117 | 119 |
|  | Mooney viscosity index | 110 | 106 | 100 | 102 | 103 | 101 | 104 | 108 | 111 | 107 |
|  | Processability of unvulcanized rubber sheet | good | good | good | good | good | good | good | good | good | good |

TABLE 3

|  |  | Comparative Example |  |  |  | Example |  |
|---|---|---|---|---|---|---|---|
|  |  | 9 | 10 | 11 | 12 | 13 | 14 |
| Formulation (parts by mass) | Natural rubber | 20 | 20 | 20 | 20 | 20 | 20 |
|  | Copolymer (3) | 60 | 60 | 60 | 60 | 60 | 60 |
|  | Copolymer (10) | — | — | — | — | 20 | — |
|  | Copolymer (11) | — | — | — | — | — | 20 |
|  | Polybutadiene rubber | 20 | 20 | 20 | 20 | — | — |
|  | Silica 1 | 20 | 60 | — | 30 | 30 | 30 |
|  | Silica 2 | — | — | 60 | 30 | 30 | 30 |
|  | Silane coupling agent 1 | 1.6 | 4.8 | 4.8 | 4.8 | 4.8 | 4.8 |
|  | Carbon black | 45 | 5 | 5 | 5 | 5 | 5 |
|  | Oil | 6.5 | 6.5 | 6.5 | 6.5 | 6.5 | 6.5 |
|  | Liquid resin | — | — | — | — | — | — |
|  | Antioxidant | 2.5 | 2.5 | 2.5 | 2.5 | 2.5 | 2.5 |
|  | Stearic acid | 1 | 1 | 1 | 1 | 1 | 1 |
|  | Zinc oxide | 2.5 | 2.5 | 2.5 | 2.5 | 2.5 | 2.5 |
|  | Wax | 1.5 | 1.5 | 1.5 | 1.5 | 1.5 | 1.5 |
|  | Sulfur | 3 | 3 | 3 | 3 | 3 | 3 |
|  | Vulcanization accelerator | 1.5 | 1.5 | 1.5 | 1.5 | 1.5 | 1.5 |
| Evaluation | tan δ index | 100 | 97 | 110 | 117 | 123 | 125 |
|  | Rolling resistance index | 100 | 98 | 109 | 112 | 120 | 122 |
|  | Breaking energy index | 100 | 99 | 108 | 110 | 110 | 112 |
|  | Mooney viscosity index | 100 | 105 | 90 | 94 | 100 | 102 |
|  | Processability of unvulcanized rubber sheet | good | good | poor | poor | good | good |

TABLE 4

|  |  | Comparative Example |  |  | Example |  |  |  |  |  |  |  |  |  |  |  |
|---|---|---|---|---|---|---|---|---|---|---|---|---|---|---|---|---|
|  |  | 13 | 14 | 15 | 15 | 16 | 17 | 18 | 19 | 20 | 21 | 22 | 23 | 24 | 25 | 26 |
| Formulation (parts by mass) | Natural rubber | 20 | 20 | 20 | 20 | 20 | 20 | 20 | 20 | 20 | 20 | 20 | 20 | 20 | 20 | 20 |
|  | Copolymer (14) | 80 | — | — | — | — | — | — | — | — | — | — | — | — | — | — |
|  | Copolymer (17) | — | 80 | — | — | — | — | — | — | — | — | — | — | — | — | — |
|  | Copolymer (20) | — | — | 80 | — | — | — | — | — | — | — | — | — | — | — | — |
|  | Copolymer (12) | — | — | — | 80 | — | — | — | — | — | 80 | — | — | — | — | — |
|  | Copolymer (13) | — | — | — | — | 80 | — | — | — | — | — | 80 | — | — | — | — |
|  | Copolymer (15) | — | — | — | — | — | 80 | — | — | — | — | — | 80 | — | — | — |
|  | Copolymer (16) | — | — | — | — | — | — | 80 | — | — | — | — | — | 80 | — | — |
|  | Copolymer (18) | — | — | — | — | — | — | — | 80 | — | — | — | — | — | 80 | — |
|  | Copolymer (19) | — | — | — | — | — | — | — | — | 80 | — | — | — | — | — | 80 |
|  | Silica 1 | 20 | 20 | 20 | 20 | 20 | 20 | 20 | 20 | 20 | 30 | 30 | 30 | 30 | 30 | 30 |
|  | Silica 2 | — | — | — | — | — | — | — | — | — | 30 | 30 | 30 | 30 | 30 | 30 |
|  | Silane coupling agent 1 | 1.6 | 1.6 | 1.6 | 1.6 | 1.6 | 1.6 | 1.6 | 1.6 | 1.6 | 4.8 | 4.8 | 4.8 | 4.8 | 4.8 | 4.8 |
|  | Carbon black | 45 | 45 | 45 | 45 | 45 | 45 | 45 | 45 | 45 | 5 | 5 | 5 | 5 | 5 | 5 |
|  | Oil | 6.5 | 6.5 | 6.5 | 6.5 | 6.5 | 6.5 | 6.5 | 6.5 | 6.5 | 6.5 | 6.5 | 6.5 | 6.5 | 6.5 | 6.5 |
|  | Antioxidant | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
|  | Stearic acid | 1 | 1 | 1 | 1 | 1 | 1 | 1 | 1 | 1 | 1 | 1 | 1 | 1 | 1 | 1 |
|  | Zinc oxide | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
|  | Wax | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
|  | Sulfur | 3 | 3 | 3 | 3 | 3 | 3 | 3 | 3 | 3 | 3 | 3 | 3 | 3 | 3 | 3 |
|  | Vulcanization accelerator | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Evaluation | tan δ index | 104 | 103 | 104 | 123 | 110 | 114 | 109 | 113 | 107 | 134 | 121 | 125 | 120 | 124 | 118 |
|  | Rolling resistance index | 103 | 105 | 104 | 110 | 109 | 104 | 104 | 102 | 103 | 120 | 119 | 114 | 114 | 112 | 113 |
|  | Breaking energy index | 97 | 97 | 98 | 104 | 103 | 102 | 103 | 102 | 102 | 112 | 111 | 110 | 111 | 110 | 110 |
|  | Mooney viscosity index | 101 | 95 | 94 | 101 | 107 | 104 | 105 | 103 | 106 | 100 | 101 | 100 | 101 | 100 | 101 |
|  | Processability of unvulcanized rubber sheet | good | poor | poor | good | good | good | good | good | good | good | good | good | good | good | good |

TABLE 5

|  |  | Comparative Example |  |  |  |  |  |  | Example |  |  |  |  |  |  |  |
|---|---|---|---|---|---|---|---|---|---|---|---|---|---|---|---|---|
|  |  | 1 | 2 | 3 | 4 | 5 | 16 | 17 | 27 | 28 | 29 | 30 | 31 | 32 | 33 | 34 |
| Formulation (parts by mass) | Natural rubber | 20 | 20 | 20 | 20 | 20 | 20 | 20 | 20 | 20 | 20 | 20 | 20 | 20 | 20 | 20 |
|  | Copolymer (3) | 80 | — | — | — | — | — | — | — | — | — | — | — | — | — | — |
|  | Copolymer (6) | — | 80 | — | — | — | — | — | — | — | — | — | — | — | — | — |
|  | Copolymer (2) | — | — | 80 | — | — | 80 | 80 | — | — | — | — | — | — | — | — |
|  | Copolymer (9) | — | — | — | 80 | — | — | — | — | — | — | — | — | — | — | — |
|  | Copolymer (5) | — | — | — | — | 80 | — | — | — | — | — | — | — | — | — | — |
|  | Copolymer (1) | — | — | — | — | — | — | — | 80 | — | — | 80 | — | — | — | — |
|  | Copolymer (4) | — | — | — | — | — | — | — | — | 80 | — | — | 80 | — | — | — |
|  | Copolymer (7) | — | — | — | — | — | — | — | — | — | 80 | — | — | 80 | — | — |

TABLE 5-continued

|  |  | Comparative Example |  |  |  |  |  |  | Example |  |  |  |  |  |  |  |
|---|---|---|---|---|---|---|---|---|---|---|---|---|---|---|---|---|
|  |  | 1 | 2 | 3 | 4 | 5 | 16 | 17 | 27 | 28 | 29 | 30 | 31 | 32 | 33 | 34 |
|  | Copolymer (8) | — | — | — | — | — | — | — | — | — | — | 80 | — | — | — | 80 |
|  | Silica 1 | 20 | 20 | 20 | 20 | 20 | 20 | 20 | 20 | 20 | 20 | 20 | 20 | 20 | 20 | 20 |
|  | Silica 2 | — | — | — | — | — | — | — | — | — | — | — | — | — | — | — |
|  | Silane coupling agent 1 | 1.6 | 1.6 | 1.6 | 1.6 | 1.6 | — | — | — | — | — | — | — | — | — | — |
|  | Silane coupling agent 2 | — | — | — | — | — | 1.6 | — | 1.6 | 1.6 | 1.6 | 1.6 | — | — | — | — |
|  | Silane coupling agent 3 | — | — | — | — | — | — | 1.6 | — | — | — | — | 1.6 | 1.6 | 1.6 | 1.6 |
|  | Carbon black | 45 | 45 | 45 | 45 | 45 | 45 | 45 | 45 | 45 | 45 | 45 | 45 | 45 | 45 | 45 |
|  | Oil | 6.5 | 6.5 | 6.5 | 6.5 | 6.5 | 6.5 | 6.5 | 6.5 | 6.5 | 6.5 | 6.5 | 6.5 | 6.5 | 6.5 | 6.5 |
|  | Solid resin | — | — | — | — | — | — | — | — | — | — | — | — | — | — | — |
|  | Liquid resin | — | — | — | — | — | — | — | — | — | — | — | — | — | — | — |
|  | Antioxidant | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
|  | Stearic acid | 1 | 1 | 1 | 1 | 1 | 1 | 1 | 1 | 1 | 1 | 1 | 1 | 1 | 1 | 1 |
|  | Zinc oxide | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
|  | Wax | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
|  | Sulfur | 3 | 3 | 3 | 3 | 3 | 3 | 3 | 3 | 3 | 3 | 3 | 3 | 3 | 3 | 3 |
|  | Vulcanization accelerator | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Evaluation | tan δ index | 100 | 106 | 106 | 108 | 107 | 114 | 116 | 156 | 123 | 133 | 122 | 159 | 125 | 136 | 124 |
|  | Rolling resistance index | 100 | 102 | 102 | 101 | 104 | 110 | 112 | 138 | 120 | 120 | 117 | 141 | 122 | 122 | 119 |
|  | Breaking energy index | 100 | 95 | 102 | 96 | 96 | 97 | 96 | 100 | 100 | 103 | 105 | 102 | 102 | 105 | 107 |
|  | Mooney viscosity index | 100 | 97 | 102 | 99 | 99 | 99 | 95 | 100 | 104 | 107 | 103 | 102 | 106 | 109 | 105 |
|  | Processability of unvulcanized rubber sheet | good | poor | good | poor | poor | poor | poor | good | good | good | good | good | good | good | good |

TABLE 6

|  |  | Comparative Example |  |  |  |  |  |  |  |  |  | Example |  |
|---|---|---|---|---|---|---|---|---|---|---|---|---|---|
|  |  | 18 | 19 | 20 | 21 | 22 | 23 | 24 | 25 | 26 | 27 | 35 | 36 |
| Formulation (parts by mass) | Natural rubber | 20 | 20 | 20 | 20 | 20 | 20 | 20 | 20 | 20 | 20 | 20 | 20 |
|  | Copolymer (3) | — | — | — | — | — | — | — | — | — | — | — | — |
|  | Copolymer (6) | — | — | — | — | — | — | — | — | — | — | — | — |
|  | Copolymer (2) | 80 | 80 | 80 | 80 | 80 | 80 | 80 | 80 | 80 | 80 | — | — |
|  | Copolymer (9) | — | — | — | — | — | — | — | — | — | — | — | — |
|  | Copolymer (5) | — | — | — | — | — | — | — | — | — | — | — | — |
|  | Copolymer (1) | — | — | — | — | — | — | — | — | — | — | 80 | — |
|  | Copolymer (4) | — | — | — | — | — | — | — | — | — | — | — | 80 |
|  | Copolymer (7) | — | — | — | — | — | — | — | — | — | — | — | — |
|  | Copolymer (8) | — | — | — | — | — | — | — | — | — | — | — | — |
|  | Silica 1 | 30 | 30 | 30 | 30 | 20 | 20 | 20 | 30 | 30 | 30 | 30 | 30 |
|  | Silica 2 | 30 | 30 | 30 | 30 | — | — | — | 30 | 30 | 30 | 30 | 30 |
|  | Silane coupling agent 1 | — | 4.8 | 4.8 | 4.8 | — | — | — | — | — | — | — | — |
|  | Silane coupling agent 2 | 4.8 | — | — | — | 1.6 | 1.6 | 1.6 | 4.8 | 4.8 | 4.8 | 4.8 | 4.8 |
|  | Carbon black | 5 | 5 | 5 | 5 | 45 | 45 | 45 | 5 | 5 | 5 | 5 | 5 |
|  | Oil | 6.5 | 3.5 | 3.5 | — | 3.5 | 3.5 | — | 3.5 | 3.5 | — | 6.5 | 6.5 |
|  | Solid resin | — | 3 | — | — | 3 | — | — | 3 | — | — | — | — |
|  | Liquid resin | — | — | 3 | 6.5 | — | 3 | 6.5 | — | 3 | 6.5 | — | — |
|  | Antioxidant | 2.5 | 2.5 | 2.5 | 2.5 | 2.5 | 2.5 | 2.5 | 2.5 | 2.5 | 2.5 | 2.5 | 2.5 |
|  | Stearic acid | 1 | 1 | 1 | 1 | 1 | 1 | 1 | 1 | 1 | 1 | 1 | 1 |
|  | Zinc oxide | 2.5 | 2.5 | 2.5 | 2.5 | 2.5 | 2.5 | 2.5 | 2.5 | 2.5 | 2.5 | 2.5 | 2.5 |
|  | Wax | 1.5 | 1.5 | 1.5 | 1.5 | 1.5 | 1.5 | 1.5 | 1.5 | 1.5 | 1.5 | 1.5 | 1.5 |
|  | Sulfur | 3 | 3 | 3 | 3 | 3 | 3 | 3 | 3 | 3 | 3 | 3 | 3 |
|  | Vulcanization accelerator | 1.5 | 1.5 | 1.5 | 1.5 | 1.5 | 1.5 | 1.5 | 1.5 | 1.5 | 1.5 | 1.5 | 1.5 |
| Evaluation | tan δ index | 126 | 101 | 105 | 107 | 100 | 104 | 106 | 110 | 114 | 116 | 171 | 135 |
|  | Rolling resistance index | 121 | 99 | 107 | 108 | 98 | 106 | 107 | 108 | 116 | 118 | 152 | 132 |
|  | Breaking energy index | 105 | 108 | 103 | 110 | 101 | 96 | 95 | 102 | 96 | 104 | 108 | 107 |
|  | Mooney viscosity index | 91 | 82 | 95 | 97 | 86 | 100 | 96 | 79 | 92 | 94 | 100 | 103 |
|  | Processability of unvulcanized rubber sheet | poor | poor | poor | poor | poor | good | good | poor | poor | poor | good | good |

TABLE 6-continued

| | | Example | | | | | | | | | |
|---|---|---|---|---|---|---|---|---|---|---|---|
| | | 37 | 38 | 39 | 40 | 41 | 42 | 43 | 44 | 45 | 46 |
| Formulation (parts by mass) | Natural rubber | 20 | 20 | 20 | 20 | 20 | 20 | 20 | 20 | 20 | 20 |
| | Copolymer (3) | — | — | — | — | — | — | — | — | — | — |
| | Copolymer (6) | — | — | — | — | — | — | — | — | — | — |
| | Copolymer (2) | — | — | — | — | — | — | — | — | — | — |
| | Copolymer (9) | — | — | — | — | — | — | — | — | — | — |
| | Copolymer (5) | — | — | — | — | — | — | — | — | — | — |
| | Copolymer (1) | — | — | 80 | — | — | — | 80 | — | — | — |
| | Copolymer (4) | — | — | — | 80 | — | — | — | 80 | — | — |
| | Copolymer (7) | 80 | — | — | — | 80 | — | — | — | 80 | — |
| | Copolymer (8) | — | 80 | — | — | — | 80 | — | — | — | 80 |
| | Silica 1 | 30 | 30 | 20 | 20 | 20 | 20 | 30 | 30 | 30 | 30 |
| | Silica 2 | 30 | 30 | — | — | — | — | 30 | 30 | 30 | 30 |
| | Silane coupling agent 1 | — | — | — | — | — | — | — | — | — | — |
| | Silane coupling agent 2 | 4.8 | 4.8 | 1.6 | 1.6 | 1.6 | 1.6 | 4.8 | 4.8 | 4.8 | 4.8 |
| | Carbon black | 5 | 5 | 45 | 45 | 45 | 45 | 5 | 5 | 5 | 5 |
| | Oil | 6.5 | 6.5 | — | — | — | — | — | — | — | — |
| | Solid resin | — | — | — | — | — | — | — | — | — | — |
| | Liquid resin | — | — | 6.5 | 6.5 | 6.5 | 6.5 | 6.5 | 6.5 | 6.5 | 6.5 |
| | Antioxidant | 2.5 | 2.5 | 2.5 | 2.5 | 2.5 | 2.5 | 2.5 | 2.5 | 2.5 | 2.5 |
| | Stearic acid | 1 | 1 | 1 | 1 | 1 | 1 | 1 | 1 | 1 | 1 |
| | Zinc oxide | 2.5 | 2.5 | 2.5 | 2.5 | 2.5 | 2.5 | 2.5 | 2.5 | 2.5 | 2.5 |
| | Wax | 1.5 | 1.5 | 1.5 | 1.5 | 1.5 | 1.5 | 1.5 | 1.5 | 1.5 | 1.5 |
| | Sulfur | 3 | 3 | 3 | 3 | 3 | 3 | 3 | 3 | 3 | 3 |
| | Vulcanization accelerator | 1.5 | 1.5 | 1.5 | 1.5 | 1.5 | 1.5 | 1.5 | 1.5 | 1.5 | 1.5 |
| Evaluation | tan δ index | 146 | 134 | 158 | 125 | 135 | 127 | 174 | 137 | 148 | 139 |
| | Rolling resistance index | 132 | 128 | 142 | 122 | 126 | 122 | 156 | 133 | 138 | 133 |
| | Breaking energy index | 111 | 113 | 106 | 105 | 109 | 111 | 107 | 106 | 110 | 112 |
| | Mooney viscosity index | 105 | 102 | 110 | 114 | 117 | 113 | 102 | 105 | 108 | 104 |
| | Processability of unvulcanized rubber sheet | good | good | good | good | good | good | good | good | good | good |

TABLE 7

| | | Comparative Example | | | Example | | | |
|---|---|---|---|---|---|---|---|---|
| | | 9 | 28 | 29 | 47 | 48 | 49 | 50 |
| Formulation (parts by mass) | Natural rubber | 20 | 20 | 20 | 20 | 20 | 20 | 20 |
| | Copolymer (3) | 60 | 60 | 60 | 60 | 60 | 60 | 60 |
| | Copolymer (10) | — | — | — | 20 | — | 20 | — |
| | Copolymer (11) | — | — | — | — | 20 | — | 20 |
| | Polybutadiene rubber | 20 | 20 | 20 | — | — | — | — |
| | Silica 1 | 20 | 20 | 20 | 20 | 20 | 20 | 20 |
| | Silica 2 | — | — | — | — | — | — | — |
| | Silane coupling agent 1 | 1.6 | — | — | — | — | — | — |
| | Silane coupling agent 2 | — | 1.6 | — | 1.6 | 1.6 | — | — |
| | Silane coupling agent 3 | — | — | 1.6 | — | — | 1.6 | 1.6 |
| | Carbon black | 45 | 45 | 45 | 45 | 45 | 45 | 45 |
| | Oil | 6.5 | 6.5 | 6.5 | 6.5 | 6.5 | 6.5 | 6.5 |
| | Liquid resin | — | — | — | — | — | — | — |
| | Antioxidant | 2.5 | 2.5 | 2.5 | 2.5 | 2.5 | 2.5 | 2.5 |
| | Stearic acid | 1 | 1 | 1 | 1 | 1 | 1 | 1 |
| | Zinc oxide | 2.5 | 2.5 | 2.5 | 2.5 | 2.5 | 2.5 | 2.5 |
| | Wax | 1.5 | 1.5 | 1.5 | 1.5 | 1.5 | 1.5 | 1.5 |
| | Sulfur | 3 | 3 | 3 | 3 | 3 | 3 | 3 |
| | Vulcanization accelerator | 1.5 | 1.5 | 1.5 | 1.5 | 1.5 | 1.5 | 1.5 |
| Evaluation | tan δ index | 100 | 114 | 116 | 121 | 123 | 122 | 124 |
| | Rolling resistance index | 100 | 110 | 111 | 118 | 120 | 119 | 121 |
| | Breaking energy index | 100 | 97 | 100 | 100 | 102 | 101 | 103 |
| | Mooney viscosity index | 100 | 99 | 97 | 102 | 104 | 100 | 102 |
| | Processability of unvulcanized rubber sheet | good | poor | poor | good | good | good | good |

TABLE 8

|  |  | Example |  |  |  |  |  |  |  |  |  |  |  |
|---|---|---|---|---|---|---|---|---|---|---|---|---|---|
|  |  | 51 | 52 | 53 | 54 | 55 | 56 | 57 | 58 | 59 | 60 | 61 | 62 |
| Formulation (parts by mass) | Natural rubber | 20 | 20 | 20 | 20 | 20 | 20 | 20 | 20 | 20 | 20 | 20 | 20 |
|  | Copolymer (12) | 80 | — | — | — | — | — | 80 | — | — | — | — | — |
|  | Copolymer (13) | — | 80 | — | — | — | — | — | 80 | — | — | — | — |
|  | Copolymer (15) | — | — | 80 | — | — | — | — | — | 80 | — | — | — |
|  | Copolymer (16) | — | — | — | — | — | — | — | — | — | 80 | — | — |
|  | Copolymer (18) | — | — | — | — | 80 | — | — | — | — | — | 80 | — |
|  | Copolymer (19) | — | — | — | — | — | 80 | — | — | — | — | — | 80 |
|  | Silica 1 | 20 | 20 | 20 | 20 | 20 | 20 | 20 | 20 | 20 | 20 | 20 | 20 |
|  | Silica 2 | — | — | — | — | — | — | — | — | — | — | — | — |
|  | Silane coupling agent 1 | — | — | — | — | — | — | — | — | — | — | — | — |
|  | Silane coupling agent 2 | 1.6 | 1.6 | 1.6 | 1.6 | 1.6 | 1.6 | — | — | — | — | — | — |
|  | Silane coupling agent 3 | — | — | — | — | — | — | 1.6 | 1.6 | 1.6 | 1.6 | 1.6 | 1.6 |
|  | Carbon black | 45 | 45 | 45 | 45 | 45 | 45 | 45 | 45 | 45 | 45 | 45 | 45 |
|  | Oil | 6.5 | 6.5 | 6.5 | 6.5 | 6.5 | 6.5 | 6.5 | 6.5 | 6.5 | 6.5 | 6.5 | 6.5 |
|  | Solid resin | — | — | — | — | — | — | — | — | — | — | — | — |
|  | Liquid resin | — | — | — | — | — | — | — | — | — | — | — | — |
|  | Antioxidant | 2.5 | 2.5 | 2.5 | 2.5 | 2.5 | 2.5 | 2.5 | 2.5 | 2.5 | 2.5 | 2.5 | 2.5 |
|  | Stearic acid | 1 | 1 | 1 | 1 | 1 | 1 | 1 | 1 | 1 | 1 | 1 | 1 |
|  | Zinc oxide | 2.5 | 2.5 | 2.5 | 2.5 | 2.5 | 2.5 | 2.5 | 2.5 | 2.5 | 2.5 | 2.5 | 2.5 |
|  | Wax | 1.5 | 1.5 | 1.5 | 1.5 | 1.5 | 1.5 | 1.5 | 1.5 | 1.5 | 1.5 | 1.5 | 1.5 |
|  | Sulfur | 3 | 3 | 3 | 3 | 3 | 3 | 3 | 3 | 3 | 3 | 3 | 3 |
|  | Vulcanization accelerator | 1.5 | 1.5 | 1.5 | 1.5 | 1.5 | 1.5 | 1.5 | 1.5 | 1.5 | 1.5 | 1.5 | 1.5 |
| Evaluation | tan δ index | 127 | 114 | 118 | 113 | 117 | 111 | 131 | 118 | 122 | 117 | 121 | 115 |
|  | Rolling resistance index | 115 | 114 | 109 | 109 | 107 | 108 | 119 | 118 | 113 | 113 | 111 | 112 |
|  | Breaking energy index | 110 | 109 | 108 | 109 | 108 | 108 | 112 | 111 | 110 | 111 | 110 | 110 |
|  | Mooney viscosity index | 105 | 111 | 108 | 109 | 107 | 110 | 100 | 106 | 103 | 104 | 102 | 105 |
|  | Processability of unvulcanized rubber sheet | good | good | good | good | good | good | good | good | good | good | good | good |

TABLE 9

|  |  | Comparative Example |  |  |  |  |  |  |  | Example |  |  |  |
|---|---|---|---|---|---|---|---|---|---|---|---|---|---|
|  |  | 1 | 2 | 3 | 4 | 5 | 30 | 31 | 32 | 63 | 64 | 65 | 66 |
| Formulation (parts by mass) | Natural rubber | 20 | 20 | 20 | 20 | 20 | 20 | 20 | 20 | 20 | 20 | 20 | 20 |
|  | Copolymer (3) | 80 | — | — | — | — | — | — | — | — | — | — | — |
|  | Copolymer (6) | — | 80 | — | — | — | — | — | — | — | — | — | — |
|  | Copolymer (2) | — | — | 80 | — | — | 80 | 80 | 80 | — | — | — | — |
|  | Copolymer (9) | — | — | — | 80 | — | — | — | — | — | — | — | — |
|  | Copolymer (5) | — | — | — | — | 80 | — | — | — | — | — | — | — |
|  | Copolymer (1) | — | — | — | — | — | — | — | — | 80 | — | — | — |
|  | Copolymer (4) | — | — | — | — | — | — | — | — | — | 80 | — | — |
|  | Copolymer (7) | — | — | — | — | — | — | — | — | — | — | 80 | — |
|  | Copolymer (8) | — | — | — | — | — | — | — | — | — | — | — | 80 |
|  | Silica 1 | 20 | 20 | 20 | 20 | 20 | 20 | 20 | 20 | 20 | 20 | 20 | 20 |
|  | Silane coupling agent 1 | 1.6 | 1.6 | 1.6 | 1.6 | 1.6 | 1.6 | 1.6 | 1.6 | 1.6 | 1.6 | 1.6 | 1.6 |
|  | Carbon black | 45 | 45 | 45 | 45 | 45 | 45 | 45 | 45 | 45 | 45 | 45 | 45 |
|  | Oil | 6.5 | 6.5 | 6.5 | 6.5 | 6.5 | 3.5 | 3.5 | — | — | — | — | — |
|  | Solid resin | — | — | — | — | — | — | 3 | — | — | — | — | — |
|  | Liquid resin | — | — | — | — | — | — | — | 3 | 6.5 | 6.5 | 6.5 | 6.5 |
|  | Antioxidant | 2.5 | 2.5 | 2.5 | 2.5 | 2.5 | 2.5 | 2.5 | 2.5 | 2.5 | 2.5 | 2.5 | 2.5 |
|  | Stearic acid | 1 | 1 | 1 | 1 | 1 | 1 | 1 | 1 | 1 | 1 | 1 | 1 |
|  | Zinc oxide | 2.5 | 2.5 | 2.5 | 2.5 | 2.5 | 2.5 | 2.5 | 2.5 | 2.5 | 2.5 | 2.5 | 2.5 |
|  | Wax | 1.5 | 1.5 | 1.5 | 1.5 | 1.5 | 1.5 | 1.5 | 1.5 | 1.5 | 1.5 | 1.5 | 1.5 |
|  | Sulfur | 3 | 3 | 3 | 3 | 3 | 3 | 3 | 3 | 3 | 3 | 3 | 3 |
|  | Vulcanization accelerator | 1.5 | 1.5 | 1.5 | 1.5 | 1.5 | 1.5 | 1.5 | 1.5 | 1.5 | 1.5 | 1.5 | 1.5 |
| Evaluation | tan δ index | 100 | 106 | 106 | 108 | 107 | 92 | 96 | 98 | 147 | 116 | 125 | 118 |
|  | Rolling resistance index | 100 | 102 | 102 | 101 | 104 | 91 | 98 | 99 | 132 | 113 | 117 | 113 |
|  | Breaking energy index | 100 | 95 | 102 | 96 | 96 | 99 | 94 | 101 | 104 | 103 | 107 | 109 |
|  | Mooney viscosity index | 100 | 97 | 102 | 99 | 99 | 89 | 103 | 105 | 113 | 118 | 121 | 117 |
|  | Processability of unvulcanized rubber sheet | good | poor | good | poor | poor | poor | good | good | good | good | good | good |

TABLE 10

|  |  | Comparative Example | Example | | |
|---|---|---|---|---|---|
|  |  | 9 | 33 | 67 | 68 |
| Formulation (parts by mass) | Natural rubber | 20 | 20 | 20 | 20 |
|  | Copolymer (3) | 60 | 60 | 60 | 60 |
|  | Copolymer (10) | — | — | 20 | — |
|  | Copolymer (11) | — | — | — | 20 |
|  | Polybutadiene rubber | 20 | 20 | — | — |
|  | Silica 1 | 20 | 20 | 20 | 20 |
|  | Silane coupling agent 1 | 1.6 | 1.6 | 1.6 | 1.6 |
|  | Carbon black | 45 | 45 | 45 | 45 |
|  | Oil | 6.5 | — | — | — |
|  | Liquid resin | — | 6.5 | 6.5 | 6.5 |
|  | Antioxidant | 2.5 | 2.5 | 2.5 | 2.5 |
|  | Stearic acid | 1 | 1 | 1 | 1 |
|  | Zinc oxide | 2.5 | 2.5 | 2.5 | 2.5 |
|  | Wax | 1.5 | 1.5 | 1.5 | 1.5 |
|  | Sulfur | 3 | 3 | 3 | 3 |
|  | Vulcanization accelerator | 1.5 | 1.5 | 1.5 | 1.5 |
| Evaluation | tan δ index | 100 | 98 | 110 | 112 |
|  | Rolling resistance index | 100 | 99 | 107 | 109 |
|  | Breaking energy index | 100 | 101 | 101 | 103 |
|  | Mooney viscosity index | 100 | 105 | 116 | 118 |
|  | Processability of unvulcanized rubber sheet | good | good | good | good |

TABLE 11

|  |  | Example | | | | | |
|---|---|---|---|---|---|---|---|
|  |  | 69 | 70 | 71 | 72 | 73 | 74 |
| Formulation (parts by mass) | Natural rubber | 20 | 20 | 20 | 20 | 20 | 20 |
|  | Copolymer (12) | 80 | — | — | — | — | — |
|  | Copolymer (13) | — | 80 | — | — | — | — |
|  | Copolymer (15) | — | — | 80 | — | — | — |
|  | Copolymer (16) | — | — | — | 80 | — | — |
|  | Copolymer (18) | — | — | — | — | 80 | — |
|  | Copolymer (19) | — | — | — | — | — | 80 |
|  | Silica 1 | 20 | 20 | 20 | 20 | 20 | 20 |
|  | Silane coupling agent 1 | 1.6 | 1.6 | 1.6 | 1.6 | 1.6 | 1.6 |
|  | Carbon black | 45 | 45 | 45 | 45 | 45 | 45 |
|  | Oil | — | — | — | — | — | — |
|  | Solid resin | — | — | — | — | — | — |
|  | Liquid resin | 6.5 | 6.5 | 6.5 | 6.5 | 6.5 | 6.5 |
|  | Antioxidant | 2.5 | 2.5 | 2.5 | 2.5 | 2.5 | 2.5 |
|  | Stearic acid | 1 | 1 | 1 | 1 | 1 | 1 |
|  | Zinc oxide | 2.5 | 2.5 | 2.5 | 2.5 | 2.5 | 2.5 |
|  | Wax | 1.5 | 1.5 | 1.5 | 1.5 | 1.5 | 1.5 |
|  | Sulfur | 3 | 3 | 3 | 3 | 3 | 3 |
|  | Vulcanization accelerator | 1.5 | 1.5 | 1.5 | 1.5 | 1.5 | 1.5 |
| Evaluation | tan δ index | 121 | 108 | 112 | 107 | 111 | 105 |
|  | Rolling resistance index | 109 | 108 | 103 | 103 | 101 | 102 |
|  | Breaking energy index | 105 | 104 | 103 | 104 | 103 | 103 |
|  | Mooney viscosity index | 106 | 112 | 109 | 110 | 108 | 111 |
|  | Processability of unvulcanized rubber sheet | good | good | good | good | good | good |

As shown in Tables 2 to 11, since each of the rubber compositions of the examples contains a specific amount of a conjugated diene copolymer having a specific amine structure at an initiation terminal, a structural unit derived from a silicon-containing compound at a main chain, and a structural unit derived from a compound containing a nitrogen atom and/or a silicon atom at a termination terminal, a specific amount of silica, and a specific amount of a mercapto group-containing silane coupling agent, these rubber compositions exhibited a balanced improvement in fuel economy, tensile strength at break, and processability as compared to the rubber compositions of the comparative examples.

The rubber compositions of Examples 5 to 14 and 21 to 74, each containing the conjugated diene polymer together with at least one of a mercapto group-containing silane coupling agent, a combination of two kinds of silica having specific nitrogen adsorption specific surface areas, and a liquid resin having a specific softening point, exhibited greatly improved properties. Especially, the rubber compositions of Examples 43 to 46, each combining all the above components, exhibited particularly good properties.

The invention claimed is:

1. A rubber composition, comprising
   a conjugated diene polymer and
   silica,
   the conjugated diene polymer being obtained by polymerizing a monomer component including a conjugated diene compound and a silicon-containing vinyl compound in the presence of a polymerization initiator represented by the following formula (I):

(I)

wherein i represents 0 or 1; $R^{11}$ represents a $C_{1-100}$ hydrocarbylene group; $R^{12}$ and $R^{13}$ each represent an optionally substituted hydrocarbyl group or a trihydrocarbylsilyl group, or $R^{12}$ and $R^{13}$ are bonded to each other to form a hydrocarbylene group optionally containing at least one, as a hetero atom, selected from the group consisting of a silicon atom, a nitrogen atom, and an oxygen atom; and M represents an alkali metal atom, to produce a copolymer, and then reacting a compound containing at least one of a nitrogen atom and a silicon atom with an active terminal of the copolymer, wherein the rubber composition comprises the conjugated diene polymer in an amount of not less than 10% by mass based on 100% by mass of a rubber component of the rubber composition, and the silica in an amount of 10 to 70 parts by mass for each 100 parts by mass of the rubber component.

2. The rubber composition according to claim 1, wherein $R^{11}$ in the formula (I) is a group represented by the following formula (Ia):

(Ia)

wherein $R^{14}$ represents a hydrocarbylene group comprising at least one of a structural unit derived from a conjugated diene compound and a structural unit derived from an aromatic vinyl compound; and n represents an integer of 1 to 10.

3. The rubber composition according to claim 2, wherein $R^{14}$ in the formula (Ia) is a hydrocarbylene group comprising from one to ten isoprene-derived structural unit(s).

4. The rubber composition according to claim 1,
wherein the silicon-containing vinyl compound is a compound represented by the following formula (II):

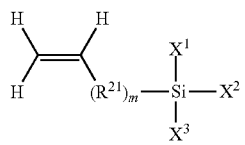

wherein m represents 0 or 1; $R^{21}$ represents a hydrocarbylene group; and $X^1$, $X^2$, and $X^3$ each represent a substituted amino group, a hydrocarbyloxy group, or an optionally substituted hydrocarbyl group.

5. The rubber composition according to claim 1,
wherein the conjugated diene polymer contains a structural unit derived from an aromatic vinyl compound.

6. The rubber composition according to claim 1,
wherein the silica has a nitrogen adsorption specific surface area of 40 to 400 $m^2/g$.

7. The rubber composition according to claim 1,
wherein the silica includes silica (1) having a nitrogen adsorption specific surface area of at least 40 $m^2/g$ but less than 120 $m^2/g$, and silica (2) having a nitrogen adsorption specific surface area of not less than 120 $m^2/g$.

8. The rubber composition according to claim 1, comprising
a liquid resin having a softening point of −20 to 20° C. in an amount of 1 to 10 parts by mass for each 100 parts by mass of the rubber component.

9. The rubber composition according to claim 1,
wherein the silica includes silica (1) having a nitrogen adsorption specific surface area of at least 40 $m^2/g$ but less than 120 $m^2/g$, and silica (2) having a nitrogen adsorption specific surface area of not less than 120 $m^2/g$, and
the rubber composition comprises a liquid resin having a softening point of −20 to 20° C. in an amount of 1 to 10 parts by mass for each 100 parts by mass of the rubber component.

10. The rubber composition according to claim 1, comprising
a mercapto group-containing silane coupling agent in an amount of 1 to 20 parts by mass for each 100 parts by mass of the silica.

11. The rubber composition according to claim 1,
wherein the rubber composition comprises a mercapto group-containing silane coupling agent in an amount of 1 to 20 parts by mass for each 100 parts by mass of the silica, and
the silica includes silica (1) having a nitrogen adsorption specific surface area of at least 40 $m^2/g$ but less than 120 $m^2/g$, and silica (2) having a nitrogen adsorption specific surface area of not less than 120 $m^2/g$.

12. The rubber composition according to claim 11, comprising
a mercapto group-containing silane coupling agent in an amount of 1 to 20 parts by mass for each 100 parts by mass of the silica, and
a liquid resin having a softening point of −20 to 20° C. in an amount of 1 to 10 parts by mass for each 100 parts by mass of the rubber component.

13. The rubber composition according to claim 1,
wherein the rubber composition comprises a mercapto group-containing silane coupling agent in an amount of 1 to 20 parts by mass for each 100 parts by mass of the silica,
the silica includes silica (1) having a nitrogen adsorption specific surface area of at least 40 $m^2/g$ but less than 120 $m^2/g$, and silica (2) having a nitrogen adsorption specific surface area of not less than 120 $m^2/g$, and
the rubber composition comprises a liquid resin having a softening point of −20 to 20° C. in an amount of 1 to 10 parts by mass for each 100 parts by mass of the rubber component.

14. The rubber composition according to claim 1,
wherein the rubber composition comprises a mercapto group-containing silane coupling agent in an amount of 1 to 20 parts by mass for each 100 parts by mass of the silica, and
the silane coupling agent is at least one of a compound represented by the formula (1) below, and a compound containing a linking unit A represented by the formula (2) below and a linking unit B represented by the formula (3) below,

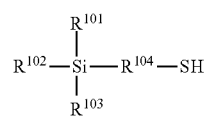

wherein $R^{101}$ to $R^{103}$ each represent a branched or unbranched $C_{1-12}$ alkyl group, a branched or unbranched $C_{1-12}$ alkoxy group, or a group represented by —O—($R^{111}$—O)$_z$—$R^{112}$ where z $R^{111}$ s each represent a branched or unbranched $C_{1-30}$ divalent hydrocarbon group, and z $R^{111}$ s may be the same as or different from one another; $R^{112}$ represents a branched or unbranched $C_{1-30}$ alkyl group, a branched or unbranched $C_{2-30}$ alkenyl group, a $C_{6-30}$ aryl group, or a $C_{7-30}$ aralkyl group; and z represents an integer of 1 to 30, and be to $R^{101}$ to $R^{103}$ may be the same as or different from one another; and $R^{104}$ represents a branched or unbranched $C_{1-6}$ alkylene group;

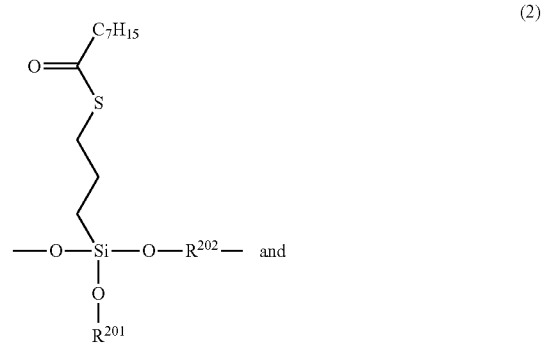

-continued

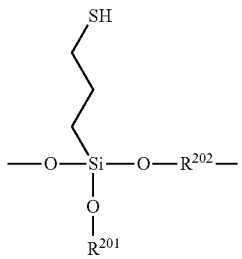

(3)

wherein $R^{201}$ represents a hydrogen atom, a halogen atom, a branched or unbranched $C_{1\text{-}30}$ alkyl group, a branched or unbranched $C_{2\text{-}30}$ alkenyl group, a branched or unbranched $C_{2\text{-}30}$ alkynyl group, or the alkyl group in which a terminal hydrogen atom is replaced with a hydroxy group or a carboxyl group; $R^{202}$ represents a branched or unbranched $C_{1\text{-}30}$ alkylene group, a branched or unbranched $C_{2\text{-}30}$ alkenylene group, or a branched or unbranched $C_{2\text{-}30}$ alkynylene group; and $R^{201}$ and $R^{202}$ may be joined together to form a cyclic structure.

15. The rubber composition according to claim 1,
wherein the silica includes silica (1) having a nitrogen adsorption specific surface area of at least 40 m²/g but less than 120 m²/g, and silica (2) having a nitrogen adsorption specific surface area of not less than 120 m²/g, and
the nitrogen adsorption specific surface areas and amounts of the silica (1) and the silica (2) satisfy the following inequalities:

(Nitrogen adsorption specific surface area of silica (2))/(Nitrogen adsorption specific surface area of silica (1))≥1.4, and (Amount of silica (1))×0.06≤(Amount of silica (2))≤ (Amount of silica (1))×15.

16. A pneumatic tire, formed from the rubber composition according to claim 1.

17. The rubber composition according to claim 2,
wherein the silicon-containing vinyl compound is a compound represented by the following formula (II):

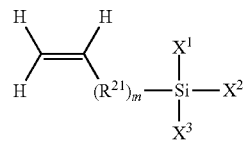

(II)

wherein m represents 0 or 1; $R^{21}$ represents a hydrocarbylene group; and $X^1$, $X^2$, and $X^3$ each represent a substituted amino group, a hydrocarbyloxy group, or an optionally substituted hydrocarbyl group.

18. The rubber composition according to claim 3,
wherein the silicon-containing vinyl compound is a compound represented by the following formula (II):

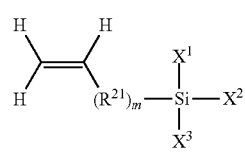

(II)

wherein m represents 0 or 1; $R^{21}$ represents a hydrocarbylene group; and $X^1$, $X^2$, and $X^3$ each represent a substituted amino group, a hydrocarbyloxy group, or an optionally substituted hydrocarbyl group.

19. The rubber composition according to claim 2,
wherein the conjugated diene polymer contains a structural unit derived from an aromatic vinyl compound.

20. The rubber composition according to claim 3,
wherein the conjugated diene polymer contains a structural unit derived from an aromatic vinyl compound.

* * * * *